US012741621B2

(12) United States Patent
Matsuyama et al.

(10) Patent No.: US 12,741,621 B2
(45) Date of Patent: Sep. 22, 2026

(54) SLIP/SKID DISCRIMINATION DEVICE, BRAKE CONTROL SYSTEM, AND SLIP/SKID DISCRIMINATION METHOD

(71) Applicant: Mitsubishi Electric Corporation, Tokyo (JP)

(72) Inventors: Etsuji Matsuyama, Tokyo (JP); Shumpei Onodera, Tokyo (JP); Naoto Tachibana, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 102 days.

(21) Appl. No.: 18/843,394

(22) PCT Filed: Mar. 8, 2022

(86) PCT No.: PCT/JP2022/009961

§ 371 (c)(1),
(2) Date: Sep. 3, 2024

(87) PCT Pub. No.: WO2023/170779

PCT Pub. Date: Sep. 14, 2023

(65) Prior Publication Data

US 2025/0196825 A1 Jun. 19, 2025

(51) Int. Cl.
*B60T 8/1761* (2006.01)
*B60T 8/17* (2006.01)
(Continued)

(52) U.S. Cl.
CPC .......... *B60T 8/1761* (2013.01); *B60T 8/1705* (2013.01); *B61H 1/00* (2013.01); *B61L 15/0062* (2024.01); *B61L 15/0081* (2013.01)

(58) Field of Classification Search
None
See application file for complete search history.

(56) References Cited

U.S. PATENT DOCUMENTS 5,480,217 A * 1/1996 Ohtsu ................. B60T 8/17616 303/167
5,498,072 A * 3/1996 Shimizu .................. B60T 8/175 303/191

(Continued)

FOREIGN PATENT DOCUMENTS

AU 2013263829 A1 * 7/2014 ............ B60T 8/1706
AU 2013263835 A1 * 7/2014 .......... B60T 18/1706

(Continued)

OTHER PUBLICATIONS

International Search Report (PCT/ISA/210) with translation and Written Opinion (PCT/ISA/237) mailed on May 10, 2022, by the Japan Patent Office as the International Searching Authority for International Application No. PCT/JP2022/009961. (13 pages).

(Continued)

*Primary Examiner* — Kevin R Steckbauer
(74) *Attorney, Agent, or Firm* — BUCHANAN, INGERSOLL & ROONEY PC

(57) ABSTRACT

A slip-and-skid determining device includes an axle speed decider, a reference axle speed decider, and a determiner. The axle speed decider decides, for each of a plurality of axles, an axle speed changeable based on a rotational speed of a wheel. The reference axle speed decider decides, based on the axle speed and a physical quantity changeable during travel of a railway vehicle, a reference axle speed in the vehicle. The determiner determines, based on comparison between the axle speed and the reference axle speed, whether any slip or skid of the wheel occurs.

13 Claims, 23 Drawing Sheets

(51) Int. Cl.
*B61H 1/00* (2006.01)
*B61L 15/00* (2006.01)

(56) References Cited

U.S. PATENT DOCUMENTS 6,246,946 B1 * 6/2001 Ohtsu ................. B60T 8/17616 303/171
8,280,568 B2 * 10/2012 Nakatsu .................. B60L 3/108 701/19
8,897,937 B2 * 11/2014 Kawada .................. B61C 17/12 701/19
10,780,904 B2 * 9/2020 Tione .................... B60T 8/1705
11,021,158 B2 * 6/2021 Mueller .............. B60W 30/188
11,161,514 B2 * 11/2021 Velazquez Alcantar ..................... B60L 15/2009
2001/0035049 A1 * 11/2001 Balch ........................ B60L 3/10 73/488
2004/0150261 A1 * 8/2004 Kawaguchi .............. H01G 9/26 303/118.1
2010/0305787 A1 * 12/2010 Nakatsu .................. B60T 8/885 701/19
2014/0163785 A1 * 6/2014 Kawada .................. B61C 17/12 701/20
2018/0257652 A1 * 9/2018 Mueller .............. B60W 30/188
2021/0078581 A1 * 3/2021 Velazquez Alcantar ..................... B60L 3/10
2025/0042260 A1 * 2/2025 Yamazaki ............... B60L 15/20
2025/0196825 A1 * 6/2025 Matsuyama .......... B60T 8/1761

FOREIGN PATENT DOCUMENTS

AU 2013263829 B2 * 11/2014 ............ B60T 8/1706
AU 2013263835 B2 * 11/2014 ............ B60T 8/1706
CN 103010227 A * 4/2013 ............ B60T 8/1706
CN 103010229 A * 4/2013 ............ B60T 8/1706
CN 117698784 A * 3/2024 ............ B60T 8/1761
DE 4400960 A1 * 9/1994 .............. B60T 8/172
DE 19706475 A1 * 8/1997 ............ B60T 8/1755
DE 4400960 B4 * 4/2005 .............. B60T 8/172
DE 19706475 B4 * 2/2006 .............. B60T 8/172
DE 112022006800 T5 * 1/2025 .......... B61L 15/0081
EP 0405570 B1 * 1/1995 .............. B60T 8/175
EP 2374680 A1 * 10/2011 ............ B60T 8/1769
EP 2374680 B1 * 7/2013 .......... B60W 40/105
EP 3056397 A1 * 8/2016 ............ B60T 8/1893
EP 3056397 B1 * 11/2019 .............. B60T 8/323
EP 3988371 A1 * 4/2022 ............ B61L 25/021
JP H0769200 A * 3/1995
JP 2000295705 A * 10/2000
JP 2003220946 A * 8/2003
JP 2008143365 A 6/2008
JP 4843198 B2 * 12/2011
JP 2016147555 A 8/2016
JP 7570572 B2 * 10/2024 ................ B60L 9/18
KR 0138406 B1 * 6/1998 .............. B60T 8/175
WO WO-2014089940 A1 * 6/2014 ............ B60T 8/1706
WO WO-2020255511 A1 * 12/2020 ............ B61L 25/021
WO WO-2023170779 A1 * 9/2023 .......... B61L 15/0081
WO WO-2024023871 A1 * 2/2024 ................ B60L 9/18

OTHER PUBLICATIONS

Japanese Office Action (Notice of Reasons for Refusal) dated Jul. 30, 2024, issued for the corresponding JP patent application No. 2024-505694 and the English translation.

* cited by examiner

SLIP/SKID DISCRIMINATION DEVICE, BRAKE CONTROL SYSTEM, AND SLIP/SKID DISCRIMINATION METHOD

TECHNICAL FIELD

The present disclosure relates to a slip-and-skid determining device, a brake control system, and a slip-and-skid determining method.

BACKGROUND ART

A traveling railway vehicle may have a slip or a skid of wheels when the adhesive force between the wheels and the rails decreases. A slip or a skid of any wheel can disable the railway vehicle from traveling at a speed corresponding to a target acceleration. Thus, it is preferable to determine occurrence of a slip or skid and moderate acceleration or deceleration of the railway vehicle to achieve re-adhesion of the wheel to the rail. Patent Literature 1 describes a brake control system as an example device to determine occurrence of a slip or a skid.

CITATION LIST

Patent Literature

Patent Literature 1: Unexamined Japanese Patent Application Publication No. 2008-143365

SUMMARY OF INVENTION

Technical Problem

The brake control system described in Patent Literature 1 determine, based on a rapid decrease in the axle speed that is caused by the skid, whether any skid occurs. More specifically, the brake control system uses, as a reference axle speed, the maximum value of the axle speeds of the four axles in each vehicle. When a difference between the axle speed of any axle and the reference axle speed is greater than or equal to a threshold, the brake control system determines that the skid occurs in the wheel attached to the axle for which the difference is greater than or equal to the threshold.

When the wheels attached to all the four axles in a single vehicle skid, the axle speed of each of these axles decreases rapidly, and then, the reference axle speed rapidly decreases as well. In this state, the difference between the axle speed of each of the axles and the reference axle speed does not increase. Thus, when the wheels attached to all axles skid, the brake control system described in Patent Literature 1 cannot detect the skid. Similarly, in detecting a slip of any wheel, this issue also arises when the wheels attached to all the four axles in the single vehicle slip.

Under such circumstances, an objective of the present disclosure is to provide a slip-and-skid determining device, a brake control system, and a slip-and-skid determining method that determines whether any slip or skid of any wheel occurs when the wheels attached to all axles in a single vehicle slip or skid.

Solution to Problem

To achieve the above objective, a slip-and-skid determining device according to an aspect of the present disclosure includes an axle speed decider, a reference axle speed decider, and a determiner. The axle speed decider decides, for each of a plurality of axles in a vehicle of one or more vehicles included in a railway vehicle, an axle speed changeable based on a rotational speed of a wheel attached to each of the plurality of axles in the vehicle. The reference axle speed decider decides, based on the axle speed of each of the plurality of axles in the vehicle and a physical quantity changeable during travel of the railway vehicle, a reference axle speed in the vehicle. The determiner determines, based on comparison between the axle speed and the reference axle speed, whether any slip or skid of the wheel occurs.

Advantageous Effects of Invention

The slip-and-skid determining device according to the above aspect of the present disclosure decides the reference axle speed based on the axle speed and the physical quantity changeable during travel of the railway vehicle, and determines, based on comparison between the axle speed and the reference axle speed, whether any slip or skid of a wheel occurs in the vehicle. The slip-and-skid determining device can thus determine whether any slip or skid of any wheel occurs when wheels attached to all axles in a single vehicle slip or skid.

BRIEF DESCRIPTION OF DRAWINGS

FIG. 3 is a block diagram illustrating the slip-and-skid determining device according to Embodiment 1:

FIG. 8 illustrates a railway vehicle provided with a slip-and-skid determining device according to Embodiment 2:

FIG. 16 is a block diagram illustrating a power converter according to Embodiment 5:

DESCRIPTION OF EMBODIMENTS

Figure 1:
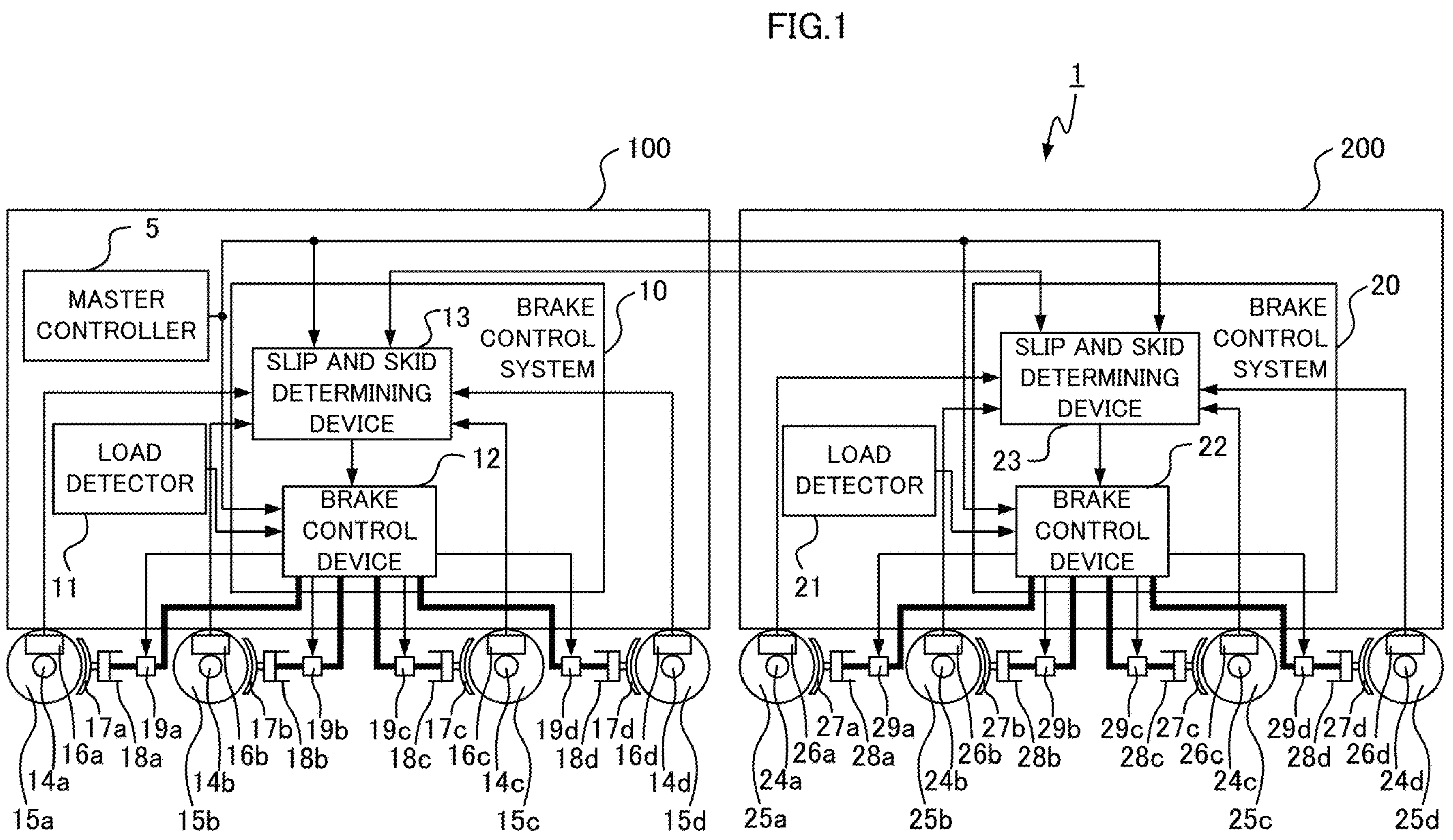
FIG. 1 illustrates a railway vehicle provided with a slip-and-skid determining device according to Embodiment 1.

A slip-and-skid determining device, a brake control system, and a slip-and-skid determining method according to one or more embodiments of the present disclosure are described in detail below with reference to the accompanying drawings. In the drawings, the components identical or corresponding to each other are provided with the same reference symbol.

Embodiment 1

A slip-and-skid determining device according to Embodiment 1 mounted on a railway vehicle including one or more vehicles is described. The slip-and-skid determining device determines whether any slip or skid of any wheel of a railway vehicle occurs, the slip or skid being caused by decrease in the adhesive force between the wheel and a rail.

A railway vehicle 1 illustrated in FIG. 1 includes a vehicle 100 and a vehicle 200 that are connected to each other. For example, the vehicle 100 is a motor coach incorporating an electric motor, which is not illustrated, and the vehicle 200 is a trailer coach without an electric motor.

The vehicle 100 includes a master controller 5 that outputs an operation command in response to an operation by an operator, a load detector 11 that detects a load on the vehicle 100, and a brake control system 10 that determines whether any slip or a skid of any wheel of the vehicle 100 occurs and controls the brake of the vehicle 100. The brake control system 10 includes a brake control device 12 that controls the brake of the vehicle 100 and a slip-and-skid determining device 13 that determines whether any slip or a skid of any wheel of the vehicle 100 occurs.

A bogie supporting the vehicle body of the vehicle 100 is provided with the electric motor and axles 14*a*, 14*b*, 14*c*, and 14*d* that rotate with a rotational force transmitted from the electric motor. A wheel 15*a* is attached to each end of the axle 14*a* and integrally rotates with the axle 14*a*. A wheel 15*b* is attached to each end of the axle 14*b* and integrally rotates with the axle 14*b*. A wheel 15*c* is attached to each end of the axle 14*c* and integrally rotates with the axle 14*c*. A wheel 15*d* is attached to each end of the axle 14*d* and integrally rotates with the axle 14*d*.

The vehicle 100 includes speed detectors 16*a*, 16*b*, 16*c*, and 16*d* that detect the rotational speeds of the respective wheels 15*a*, 15*b*, 15*c*, and 15*d*. The vehicle 100 further includes, as mechanical brake devices, brake blocks 17*a*, 17*b*, 17*c*, and 17*d* that come in contact with the respective wheels 15*a*, 15*b*, 15*c*, and 15*d* to generate a brake force, and brake cylinders 18*a*, 18*b*, 18*c*, and 18*d* attached to the respective brake blocks 17*a*, 17*b*, 17*c*, and 17*d* to receive a fluid supplied from the brake control device 12. The vehicle 100 decelerates when the brake blocks 17*a*, 17*b*, 17*c*, and 17*d* as frictional members are pressed against the wheels 15*a*, 15*b*, 15*c*, and 15*d* as rotors rotating during travel of the railway vehicle 1.

The vehicle 100 further includes anti-skid valves 19*a*, 19*b*, 19*c*, and 19*d* that discharge the fluid supplied to the respective brake cylinders 18*a*, 18*b*, 18*c*, and 18*d*.

The vehicle 200 includes a load detector 21 that detects a load on the vehicle 200 and a brake control system 20 that determines whether any slip or skid of any wheel of the vehicle 200 occurs and controls the brake of the vehicle 200. The brake control system 20 includes a brake control device 22 that controls the brake of the vehicle 200, and a slip-and-skid determining device 23 that determines whether any slip or skid of any wheel of the vehicle 200 occurs.

A bogie supporting the vehicle body of the vehicle 200 is provided with axles 24*a*, 24*b*, 24*c*, and 24*d*. A wheel 25*a* is attached to each end of the axle 24*a* and integrally rotates with the axle 24*a*. A wheel 25*b* is attached to each end of the axle 24*b* and integrally rotates with the axle 24*b*. A wheel 25*c* is attached to each end of the axle 24*c* and integrally rotates with the axle 24*c*. A wheel 25*d* is attached to each end of the axle 24*d* and integrally rotates with the axle 24*d*.

The vehicle 200 includes speed determiners 26*a*, 26*b*, 26*c*, and 26*d* that detect the rotational speeds of the respective wheels 25*a*, 25*b*, 25*c*, and 25*d*. The vehicle 200 further includes, as mechanical brake devices, brake blocks 27*a*, 27*b*, 27*c*, and 27*d* that come in contact with the respective wheels 25*a*, 25*b*, 25*c*, and 25*d* to generate a brake force, and brake cylinders 28*a*, 28*b*, 28*c*, and 28*d* attached to the respective brake blocks 27*a*, 27*b*, 27*c*, and 27*d* to receive a fluid supplied from the brake control device 22. The vehicle 200 decelerates when the brake blocks 27*a*, 27*b*, 27*c*, and 27*d* as frictional members are pressed against the wheels 25*a*, 25*b*, 25*c*, and 25*d* as rotors rotating during the travel of the railway vehicle 1.

The vehicle 200 further includes anti-skid valves 29*a*, 29*b*, 29*c*, and 29*d* that discharge the fluid supplied to the respective brake cylinders 28*a*, 28*b*, 28*c*, and 28*d*.

FIG. 1 illustrates air pipes with bold solid lines, and flows of electric signals transmitted and received between components in the vehicles 100 and 200 with solid arrows. The same applies to the subsequent figures.

As illustrated with the bold solid lines in FIG. 1, the fluid is supplied from a fluid source which is not illustrated, compressed by the brake control device 12, and supplied to the brake cylinders 18*a*, 18*b*, 18*c*, and 18*d*. The fluid is, for example, air.

A piston in the brake cylinder 18*a* slides in response to the pressure of the fluid in the brake cylinder 18*a*, causing the brake block 17*a* attached to the piston to move toward or away from the wheel 15*a*. Similarly, a piston in the brake cylinder 18*b* slides in response to the pressure of the fluid in the brake cylinder 18*b*, causing the brake block 17*b* attached to the piston to move toward or away from the wheel 15*b*. Similarly, a piston in the brake cylinder 18*c* slides in response to the pressure of the fluid in the brake cylinder 18*c*, causing the brake block 17*c* attached to the piston to move toward or away from the wheel 15*c*. Similarly, a piston in the brake cylinder 18*d* slides in response to the pressure of the fluid in the brake cylinder 18*d*, causing the brake block 17*d* attached to the piston to move toward or away from the wheel 15*d*.

The brake blocks 17*a*, 17*b*, 17*c*, and 17*d* come in contact with the respective wheels 15*a*, 15*b*, 15*c*, and 15*d* to restrict rotation of the wheels 15*a*, 15*b*, 15*c*, and 15*d*, generating the brake force.

The fluid is supplied from the fluid source, compressed by the brake control device 22, and supplied to the brake cylinders 28*a*, 28*b*, 28*c*, and 28*d*. A piston in the brake cylinder 28*a* slides in response to the pressure of the fluid in the brake cylinder 28*a*, causing the brake block 27*a* attached to the piston to move toward or away from the wheel 25*a*. Similarly, a piston in the brake cylinder 28*b* slides in response to the pressure of the fluid in the brake cylinder 28*b*, causing the brake block 27*b* attached to the piston to move toward or away from the wheel 25*b*. Similarly, a piston in the brake cylinder 28*c* slides in response to the pressure of the fluid in the brake cylinder 28*c*, causing the brake block 27*c* attached to the piston to move toward or away from the wheel 25*c*. Similarly, a piston in the brake cylinder 28*d* slides in response to the pressure of the fluid in the brake cylinder 28*d*, causing the brake block 27*d* attached to the piston to move toward or away from the wheel 25*d*.

The brake blocks 27*a*, 27*b*, 27*c*, and 27*d* come in contact with the wheels 25*a*, 25*b*, 25*c*, and 25*d* to restrict rotation of the wheels 25*a*, 25*b*, 25*c*, and 25*d*, generating the brake force.

The master controller 5 is installed on, for example, a driver's cab, and outputs the operation command in response to the operation by the operator to the brake control devices 12 and 22 and to the slip-and-skid determining devices 13 and 23. The operation command may be a powering command for accelerating the railway vehicle 1, a braking command for decelerating the railway vehicle 1, or a coasting command for causing a coasting operation of the railway vehicle 1.

The load detector 11 detects a load on the vehicle 100 based on a change in the pressure of an air spring attached to the bogie supporting the vehicle body of the vehicle 100, and transmits the detected load on the vehicle 100 to the brake control device 12. Similarly, the load detector 21 detects a load on the vehicle 200 based on a change in the pressure of an air spring attached to the bogie supporting the vehicle body of the vehicle 200, and transmits the detected load on the vehicle 200 to the brake control device 22.

Figure 2:
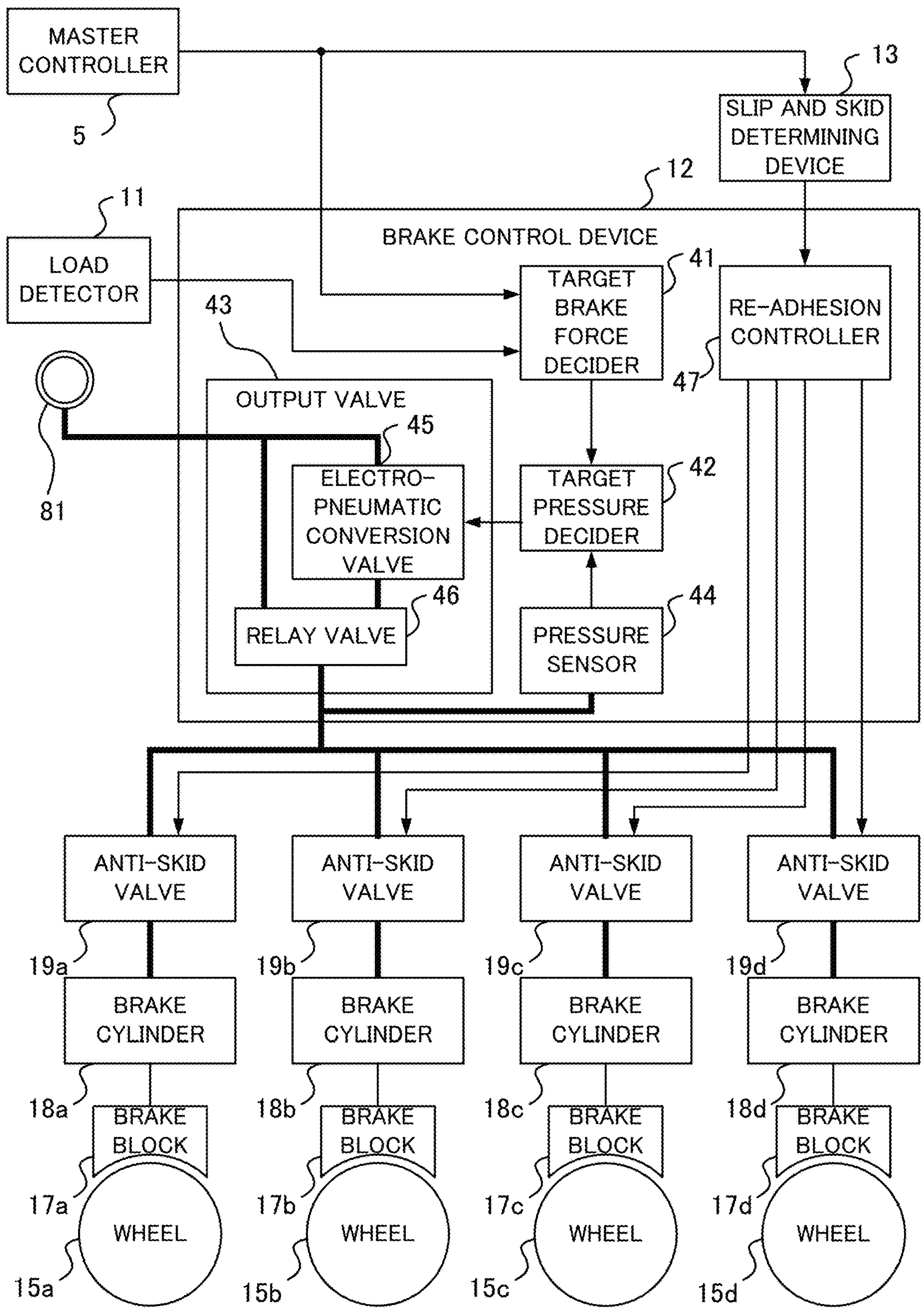
FIG. 2 is a block diagram illustrating a brake control device in Embodiment 1.

The brake control devices 12 and 22 have the same structure. The brake control device 12 is thus described with reference to FIG. 2. The brake control device 12 includes a target brake force decider 41 that decides a target brake force as a target value for the brake force of the vehicle 100, and a target pressure decider 42 that decides a target pressure as a target value for the pressure of the fluid in the brake cylinders 18*a*, 18*b*, 18*c*, and 18*d* in accordance with the target brake force. The brake control device 12 further includes an output valve 43 that compresses a fluid supplied from a fluid source 81 in accordance with the target pressure and supplies the compressed air to the brake cylinders 18*a*, 18*b*, 18*c*, and 18*d* through the anti-skid valves 19*a*, 19*b*, 19*c*, and 19*d*.

The brake control device 12 further includes a pressure sensor 44 that measures a value for the pressure of the fluid output from the output valve 43, and a re-adhesion controller 47 that adjusts the opening degrees of the anti-skid valves 19*a*, 19*b*, 19*c*, and 19*d* in accordance with a determination result received from the slip-and-skid determining device 13.

When the operation command acquired from the master controller 5 includes a braking command, the target brake force decider 41 decides the target brake force in accordance with a target deceleration indicated by the braking command and the load on the vehicle 100 acquired from the load detector 11. More specifically, the target brake force decider 41 outputs, as the target brake force, a value acquired by multiplying the target deceleration by the load on the vehicle 100 to the target pressure decider 42.

The target pressure decider 42 decides, based on a friction coefficient of a contact surface between each of the brake blocks 17*a*, 17*b*, 17*c*, and 17*d* and the corresponding wheel 15*a*, 15*b*, 15*c*, or 15*d* as well as the target braking force, a target pressing force as a target value of pressing force for pressing each of the brake blocks 17*a*, 17*b*, 17*c*, and 17*d* to the corresponding wheel 15*a*, 15*b*, 15*c*, or 15*d*. The target pressure decider 42 prestores information about the friction coefficients of contact surfaces between the brake blocks 17*a*, 17*b*, 17*c*, and 17*d* and the wheels 15*a*, 15*b*, 15*c*, and 15*d*. The target pressure decider 42 decides the target pressure as a target value for the pressure of the fluid in the brake cylinders 18*a*, 18*b*, 18*c*, and 18*d* to achieve the target pressing force.

More specifically, to acquire the target pressure, the target pressure decider 42 divides the target pressing force by the area of a surface perpendicular to a direction in which the pistons of the brake cylinders 18*a*, 18*b*, 18*c*, and 18*d* slide. The target pressure decider 42 performs feedback control to adjust the target pressure acquired through the above calculation based on the measurement value from the pressure sensor 44. The target pressure decider 42 transmits the adjusted target pressure to the output valve 43.

The output valve 43 includes an electro-pneumatic conversion valve 45 that adjusts the pressure of the fluid supplied from the fluid source 81 in accordance with the target pressure and outputs the pressure-adjusted fluid, and a relay valve 46 that compresses the fluid supplied from the fluid source 81 in accordance with the output from the electro-pneumatic conversion valve 45 and outputs the compressed fluid. The electro-pneumatic conversion valve 45 adjusts the pressure of the fluid supplied from the fluid source 81 in accordance with the target pressure indicated by an electric signal transmitted from the target pressure decider 42, and outputs the pressure-adjusted fluid to the relay valve 46. The relay valve 46 receives the pressure of the fluid output from the electro-pneumatic conversion valve 45 as a command pressure, compresses the fluid supplied from the fluid source 81 in accordance with the command pressure, and supplies the compressed fluid to the brake cylinders 18*a*, 18*b*, 18*c*, and 18*d* through the anti-skid valves 19*a*, 19*b*, 19*c*, and 19*d*.

The re-adhesion controller 47 adjusts the opening degrees of the anti-skid valves 19*a*, 19*b*, 19*c*, and 19*d* in accordance with the determination result received from the slip-and-skid determining device 13. More specifically, when the slip-and-skid determining device 13 determines that a skid of any of the wheels 15*a*, 15*b*, 15*c*, and 15*d* occurs, the re-adhesion controller 47 opens the corresponding anti-skid valve 19*a*, 19*b*, 19*c*, or 19*d* corresponding the skid wheel 15*a*, 15*b*, 15*c*, or 15*d*. When, for example, the slip-and-skid determining device 13 determines that a skid of the wheel 15*a* occurs, the re-adhesion controller 47 opens the anti-skid valve 19*a* to discharge the fluid from the brake cylinder 18*a* to which the brake block 17*a* for restricting rotation of the wheel 15*a* is attached to. When the anti-skid valve 19*a* is open, the fluid in the brake cylinder 18*a* is discharged, reducing the pressure of the fluid in the brake cylinder 18*a*. This reduces the brake force for the wheel 15*a*, and thus achieves re-adhesion of the wheel 15*a* to the rail.

Figure 3:
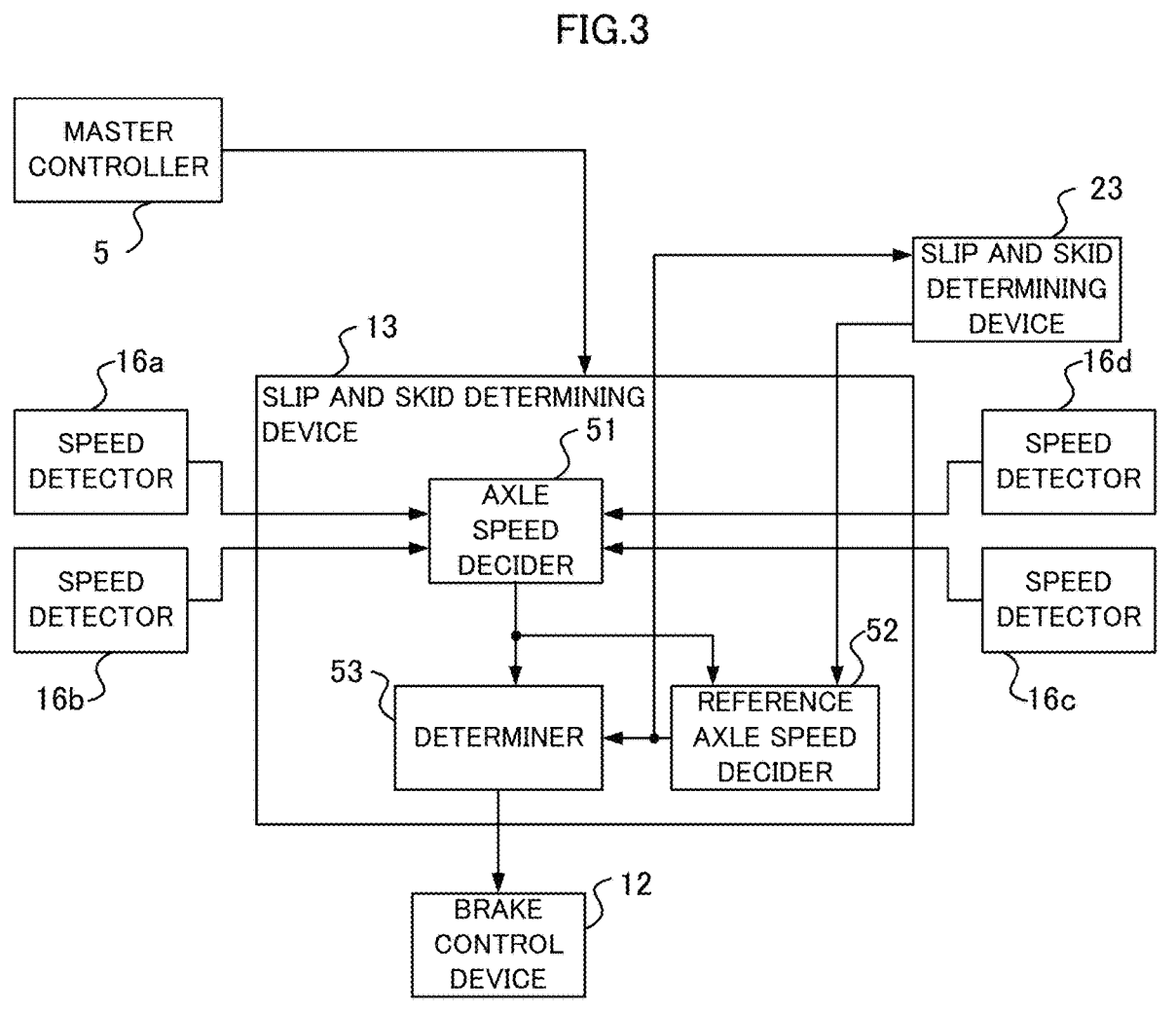

The slip-and-skid determining devices 13 and 23 have the same structure. The slip-and-skid determining device 13 that determines whether any skid occurs is thus described with reference to FIG. 3. The slip-and-skid determining device 13 includes an axle speed decider 51 that decides the axle speed of each of the axles 14_a_, 14_b_, 14_c_, and 14_d_ of the vehicle 100, a reference axle speed decider 52 that decides the reference axle speed, and a determiner 53 that determines, based on comparison between the axle speed and the reference axle speed, whether any skid of any of the wheels 15_a_, 15_b_, 15_c_, and 15_d_ occurs.

The axle speed decider 51 decides the axle speed that changes in accordance with the rotational speeds of the wheels 15_a_, 15_b_, 15_c_, and 15_d_ each attached to the ends of the corresponding axle 14_a_, 14_b_, 14_c_, or 14_d_. In Embodiment 1, the circumferential speed of each of the wheels 15_a_, 15_b_, 15_c_, and 15_d_ is used as the axle speed.

More specifically, the axle speed decider 51 acquires the measurement value of the rotational speed of each of the axles 14_a_, 14_b_, 14_c_, and 14_d_ from the corresponding speed detector 16_a_, 16_b_, 16_c_, or 16_d_. Each of the speed detectors 16_a_, 16_b_, 16_c_, and 16_d_ is located adjacent to the corresponding axle 14_a_, 14_b_, 14_c_, or 14_d_.

Each of the speed detectors 16_a_, 16_b_, 16_c_, and 16_d_ includes a speed generator that detects the rotational speed of the corresponding axle 14_a_, 14_b_, 14_c_, or 14_d_. Each speed generator outputs a sensor signal with a frequency changing in proportion to the rotational speed of the corresponding axle 14_a_, 14_b_, 14_c_, or 14_d_. Each of the speed detectors 16_a_, 16_b_, 16_c_, and 16_d_ decides the rotational speed of the corresponding axle 14_a_, 14_b_, 14_c_, or 14_d_ based on a sensor signal output from the corresponding speed generator, and outputs the decided rotational speed of the corresponding axle 14_a_, 14_b_, 14_c_, or 14_d_ to the axle speed decider 51 in the slip-and-skid determining device 13. The axle 14_a_ and the wheel 15_a_ attached to the axle 14_a_ rotate integrally.

In this structure, the rotational speed of the axle 14_a_ acquired from the speed detector 16_a_ presumably matches the rotational speed of the wheel 15_a_. Similarly, the axle 14_b_ and the wheel 15_b_ attached to the axle 14_b_ rotate integrally. In this structure, the rotational speed of the axle 14_b_ acquired from the speed detector 16_b_ presumably matches the rotational speed of the wheel 15_b_. Similarly, the axle 14_c_ and the wheel 15_c_ attached to the axle 14_c_ rotate integrally. In this structure, the rotational speed of the axle 14_c_ acquired from the speed detector 16_c_ presumably matches the rotational speed of the wheel 15_c_. Similarly, the axle 14_d_ and the wheel 15_d_ attached to the axle 14_d_ rotate integrally. In this structure, the rotational speed of the axle 14_d_ acquired from the speed detector 16_d_ presumably matches the rotational speed of the wheel 15_d_.

The axle speed decider 51 calculates the circumferential speed of each of the wheels 15_a_, 15_b_, 15_c_, and 15_d_ based on the rotational speed of the corresponding axle 14_a_, 14_b_, 14_c_, or 14_d_ acquired from the corresponding speed detector 16_a_, 16_b_, 16_c_, or 16_d_. Subsequently, the axle speed decider 51 outputs the circumferential speed of each of the wheels 15_a_, 15_b_, 15_c_, and 15_d_ to the reference axle speed decider 52 and the determiner 53 as the axle speed of the corresponding axle 14_a_ 14_b_, 14_c_, or 14_d_.

The reference axle speed decider 52 decides the reference axle speed based on the axle speed and the physical quantity that changes during the travel of the railway vehicle 1. The physical quantity changes during the travel of the railway vehicle 1, and changes in a manner different from each axle speed of the vehicle 100 when the vehicle 100 slips or skids. As the physical quantity that changes during the travel of the railway vehicle 1, the reference axle speed decider 52 uses, for example, the axle speed of the other vehicle 200, in other words, the axle speed of each of the axles 24_a_, 24_b_, 24_c_, and 24_d_.

More specifically, the reference axle speed decider 52 selects a maximum value of speeds that are the axle speed acquired from the axle speed decider 51 and the reference axle speed acquired from a reference axle speed decider included in the slip-and-skid determining device 23, and outputs the maximum value to the determiner 53 and to the slip-and-skid determining device 23 as the reference axle speed. Immediately after the slip-and-skid determining device 13 starts a skid determining process, the reference axle speed decider 52 outputs the maximum value of the axle speed of each of the axles 14_a_, 14_b_, 14_c_, and 14_d_ to the determiner 53 and to the slip-and-skid determining device 23.

The determiner 53 determines, based on comparison between each axle speed acquired from the axle speed decider 51 and the reference axle speed, whether any skid of any wheel occurs. More specifically, the determiner 53 calculates a difference between each axle speed acquired from the axle speed decider 51 and the reference axle speed, and determines whether each difference is greater than or equal to a first threshold. Each difference in speed indicates an absolute value of the difference between the corresponding axle speed and the reference axle speed. The first threshold is defined in accordance with a difference between the reference axle speed and each axle speed generated when a skid occurs during, for example, test driving or simulation of the railway vehicle 1. When any of the differences in speed is greater than or equal to the first threshold, the corresponding axle speed is supposed to be sufficiently lower than the reference axle speed. In this state, occurrence of a skid is determined. When each difference in speed is less than the first threshold, no occurrence of skid of the wheels 15_a_, 15_b_, 15_c_, and 15_d_ is determined.

The determiner 53 transmits the above determination result to the brake control device 12. For example, the determiner 53 transmits, to the brake control device 12, information about the axle 14_a_, 14_b_, 14_c_, or 14_d_ having the axle speed that has the difference from the reference axle speed greater than or equal to the first threshold.

Figure 4:
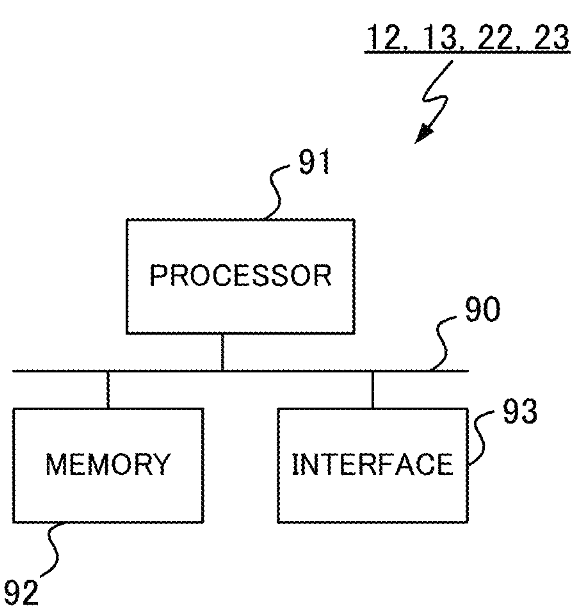
FIG. 4 illustrates a hardware configuration of the brake control device and the slip-and-skid determining device according to Embodiment 1.

FIG. 4 illustrates a hardware configuration of control units in the brake control devices 12 and 22 as well as the slip-and-skid determining devices 13 and 23 with the above structures. The brake control devices 12 and 22 and the slip-and-skid determining devices 13 and 23 each include a processor 91, a memory 92, and an interface 93. The processor 91, the memory 92, and the interface 93 are connected to one another with a bus 90. The function of each of the brake control devices 12 and 22 and the slip-and-skid determining devices 13 and 23 is implemented by software, firmware, or a combination of software and firmware. The software and the firmware are described as programs and are stored in the memory 92. The processor 91 reads and executes the programs stored in the memory 92 to implement the functions of the above components. In other words, the memory 92 stores programs for the processing performed by the components of the corresponding brake control device 12 or 22 or the corresponding slip-and-skid determining device 13 or 23.

The memory 92 is, for example, a nonvolatile or volatile semiconductor memory such as a random-access memory (RAM), a read-only memory (ROM), a flash memory, an erasable programmable ROM (EPROM), or an electrically erasable programmable ROM (EEPROM), or a magnetic disk, a flexible disk, an optical disc, a compact disc, a minidisc, or a digital versatile disc (DVD).

The brake control device 12 is connected to the master controller 5, the load detector 11, the slip-and-skid determining device 13, and the anti-skid valves 19*a*, 19*b*, 19*c*, and 19*d* via the interface 93. The brake control device 22 is connected to the master controller 5, the load detector 21, the slip-and-skid determining device 23, and the anti-skid valves 29*a*, 29*b*, 29*c*, and 29*d* via the interface 93. The slip-and-skid determining device 13 is connected to the master controller 5, the slip-and-skid determining device 23, and the speed detectors 16*a*, 16*b*, 16*c*, and 16*d* via the interface 93. The slip-and-skid determining device 23 is connected to the master controller 5, the slip-and-skid determining device 13, and the speed detectors 26*a*, 26*b*, 26*c*, and 26*d* via the interface 93. The interface 93 includes an interface module complying with one or more standards as appropriate for connection targets.

The slip-and-skid determining devices 13 and 23 with the above structure perform the skid determining process in the same manner. Thus, the skid determining process performed by the slip-and-skid determining device 13 is described with reference to FIG. 5. Upon receiving an operation command from the master controller 5, the slip-and-skid determining device 13 starts the process in FIG. 5. When the received operation command does not include a braking command (No in step S11), the processing in step S11 is repeated.

When the operation command includes a braking command (Yes in step S11), the axle speed decider 51 decides the axle speed of each of the axles 14*a*, 14*b*, 14*c*, and 14*d* based on the measurement value from the corresponding speed detector 16*a*, 16*b*, 16*c*, or 16*d* (step S12). The reference axle speed decider 52 decides, as the reference axle speed, the maximum value of speeds that are the axle speed of each axle decided in step S12 and the reference axle speed acquired from the slip-and-skid determining device 23 (step S13).

The determiner 53 calculates the difference between each axle speed decided in step S12 and the reference axle speed decided in step S13 (step S14). When the differences in speed calculated in step S14 are less than the first threshold (No in step S15), the processing in step S11 and subsequent steps described above is repeated.

When at least any of the differences in speed calculated in step S14 is greater than or equal to the first threshold (Yes in step S15), the determiner 53 outputs, to the brake control device 12, information about the axle 14*a*, 14*b*, 14*c*, or 14*d* having an axle speed that has a difference from the reference axle speed greater than or equal to the first threshold, in other words, information about any one of the axles 14*a*, 14*b*, 14*c*, and 14*d* to which the skid wheel 15*a*, 15*b*, 15*c*, or 15*d* is attached (step S16). When the processing in step S16 ends, the processing in step S11 and subsequent steps described above is repeated.

Figure 6:
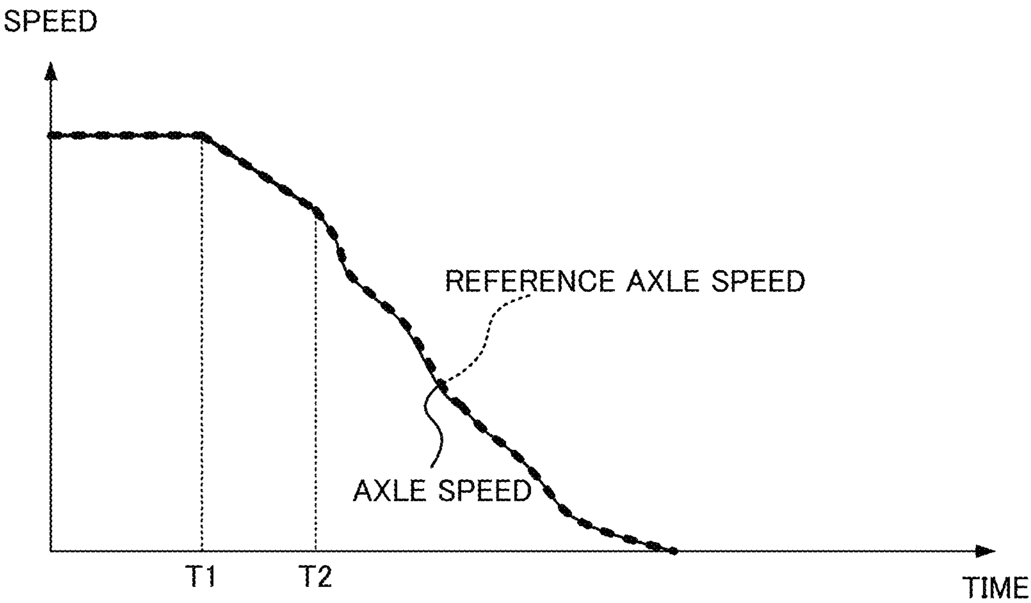
FIG. 6 illustrates example changes in an axle speed and a reference axle speed in a comparative example.

FIG. 6 illustrates changes in the reference axle speed and each axle speed in a comparative example. In the comparative example, the reference axle speed is determined based simply on each axle speed in a single vehicle, and the occurrence of skid of each wheel is determined based on whether the difference between the corresponding axle speed and the reference axle speed is greater than or equal to the threshold. In FIG. 6, the solid line indicates changes in the axle speed, and the dotted line indicates changes in the reference axle speed. In FIG. 6, the horizontal axis indicates time, and the vertical axis indicates speed. The brake control is started at time T1. At time T1 and subsequent times, each axle speed and the reference axle speed decrease at a constant rate based on the target deceleration.

All the wheels in the single vehicle skid at time T2. At time T2, each axle speed starts decreasing rapidly. In the comparative example, as described above, the reference axle speed is simply based on each axle speed in the single vehicle. Thus, when all the wheels skid, the reference axle speed rapidly decreases in the same manner as each axle speed. In this state, the difference between the reference axle speed and each axle speed does not increase. In the comparative example, no occurrence of skid is determined by mistake although all the wheels skid.

Figure 7:
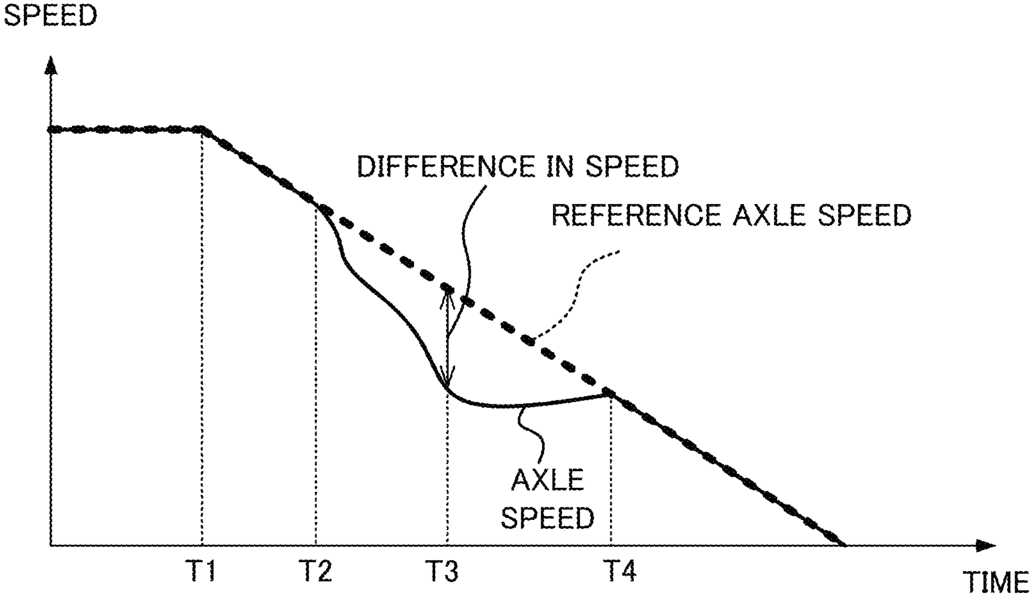
FIG. 7 illustrates example changes in an axle speed and a reference axle speed in Embodiment 1.

When, for example, all the wheels 15*a*, 15*b*, 15*c*, and 15*d* skid and none of the wheels 25*a*, 25*b*, 25*c*, and 25*d* skids, each axle speed in the vehicle 100 and the reference axle speed change as illustrated in FIG. 7. In FIG. 7, the solid line indicates changes in the axle speed, and the dotted line indicates changes in the reference axle speed. In FIG. 7, the horizontal axis indicates time, and the vertical axis indicates speed. The brake control is started at time T1. At time T1, the master controller 5 is controlled to transmit an operation command including a braking command to the slip-and-skid determining devices 13 and 23. At time T1 and subsequent times, each axle speed and the reference axle speed decrease at a constant rate based on the target deceleration.

All the wheels 15*a*, 15*b*, 15*c*, and 15*d* skid at time T2. At time T2, the axle speed of each of the axles 14*a*, 14*b*, 14*c*, and 14*d* starts decreasing rapidly. None of the wheels 25*a*, 25*b*, 25*c*, and 25*d* skids at time T2 and subsequent times. Thus, the reference axle speed acquired by the slip-and-skid determining device 13 from the slip-and-skid determining device 23 decreases at a constant rate based on the target deceleration. Thus, although the axle speed of each of the axles 14*a*, 14*b*, 14*c*, and 14*d* decreases rapidly, the reference axle speed decider 52 in the slip-and-skid determining device 13 outputs the reference axle speed that decreases at a constant rate, unlike the rapidly decreasing axle speed of each of the axles 14*a*, 14*b*, 14*c*, and 14*d*.

At time T3, for example, the difference between the axle speed of each of the axles 14*a*, 14*b*, 14*c*, and 14*d* and the reference axle speed reaches the first threshold. At time T3, the difference between the axle speed of each of the axles 14*a*, 14*b*, 14*c*, and 14*d* and the reference axle speed is greater than or equal to the first threshold, causing the determiner 53 in the slip-and-skid determining device 13 to transmit, to the brake control device 12, the determination result indicating all the wheels 15*a*, 15*b*, 15*c*, and 15*d* attached to the axles 14*a*, 14*b*, 14*c*, and 14*d* skid.

Upon receiving the above determination result from the slip-and-skid determining device 13, the brake control device 12 opens the anti-skid valves 19*a*, 19*b*, 19*c*, and 19*d* to discharge the fluid in the brake cylinders 18*a*, 18*b*, 18*c*, and 18*d*. This reduces the pressure of the fluid in the brake cylinders 18*a*, 18*b*, 18*c*, and 18*d*, and thus reduces the pressing force for pressing the brake blocks 17*a*, 17*b*, 17*c*, and 17*d* against the wheels 15*a*, 15*b*, 15*c*, and 15*d*. When the pressing force is reduced, or in other words, when the brake is released, the difference between the axle speed of each of the axles 14*a*, 14*b*, 14*c*, and 14*d* and the reference axle speed starts decreasing. Subsequently, the difference between the axle speed of each of the axles 14*a*, 14*b*, 14*c*, and 14*d* and the reference axle speed reaches zero, achieving re-adhesion of the wheels 15*a*, 15*b*, 15*c*, and 15*d* to the rails at time T4.

As described above, the slip-and-skid determining device 13 according to Embodiment 1 decides the reference axle speed based on the axle speed of each of the axles 14*a*, 14*b*, 14*c*, and 14*d* in the vehicle 100 and the reference axle speed based on the axle speed of each of the axles 24*a*, 24*b*, 24*c*, and 24*d* in the other vehicle 200. This prevents the reference axle speed from decreasing rapidly unlike the axle speed of each of the axles 14*a*, 14*b*, 14*c*, and 14*d* in the vehicle 100, although all the wheels 15*a*, 15*b*, 15*c*, and 15*d* attached to the axles 14*a*, 14*b*, 14*c*, and 14*d* skid, thus allowing determining, based on the difference between each axle speed and the reference axle speed, whether any skid of any wheel occurs. Similarly, the slip-and-skid determining device 23 can determine whether any skid of any of the wheels 25*a*, 25*b*, 25*c*, and 25*d* attached to the axles 24*a*, 24*b*, 24*c*, and 24*d* of the vehicle 200 occurs also when all the wheels 25*a*, 25*b*, 25*c*, and 25*d* skid.

Embodiment 2

The method for deciding the reference axle speed based on each axle speed and the physical quantity that changes during the travel of the railway vehicle is not limited to the examples described above. A slip-and-skid determining device according to Embodiment 2 decides the reference axle speed with a method different from the method used in Embodiment 1, and is thus described focusing on differences from Embodiment 1.

Figure 8:
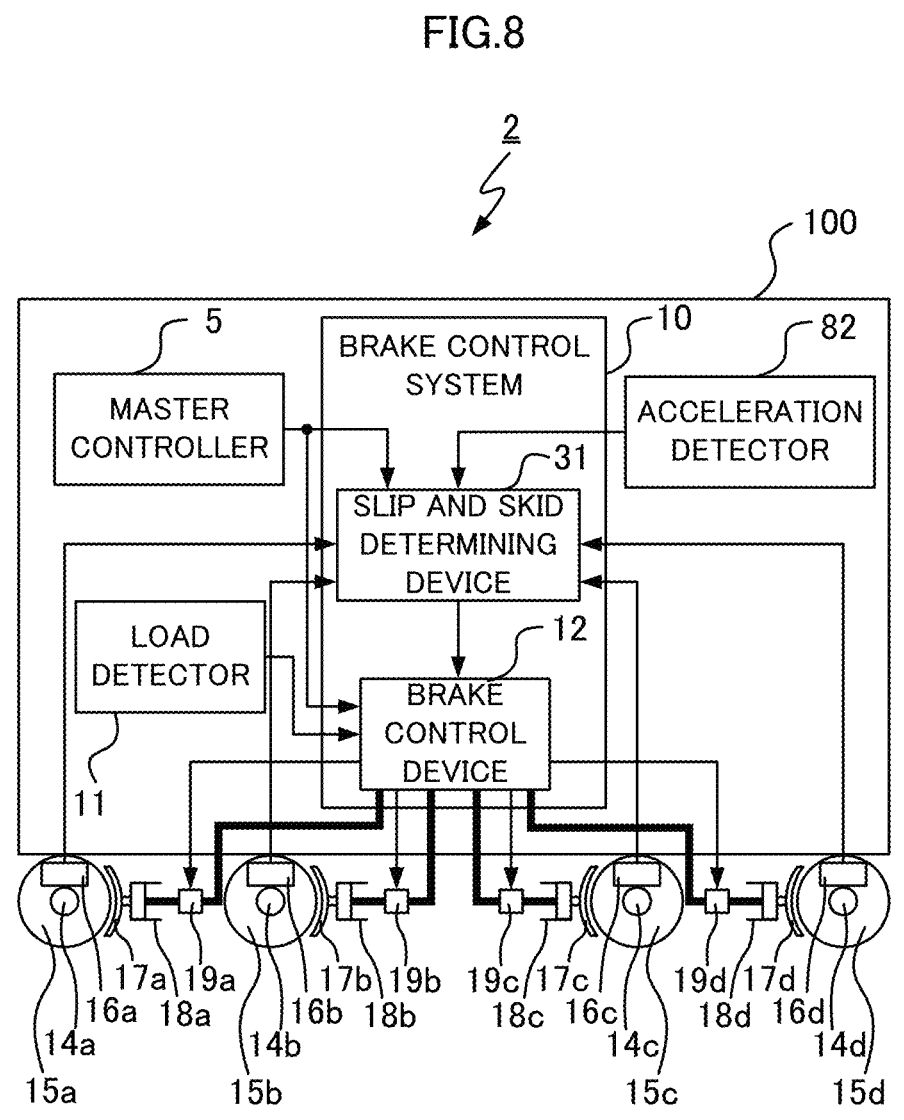

In FIG. 8, a railway vehicle 2 includes the vehicle 100. The vehicle 100 includes a slip-and-skid determining device 31 that determines whether any skid of any of the wheels 15*a*, 15*b*, 15*c*, and 15*d* in the vehicle 100 occurs and an acceleration detector 82 that detects the acceleration of the vehicle 100.

The acceleration detector 82 measures the acceleration of the vehicle 100, and transmits data indicating the measurement value to the slip-and-skid determining device 31. When the vehicle 100 accelerates, the measurement value is positive. When the vehicle 100 decelerates, the measurement value is negative.

Figure 9:
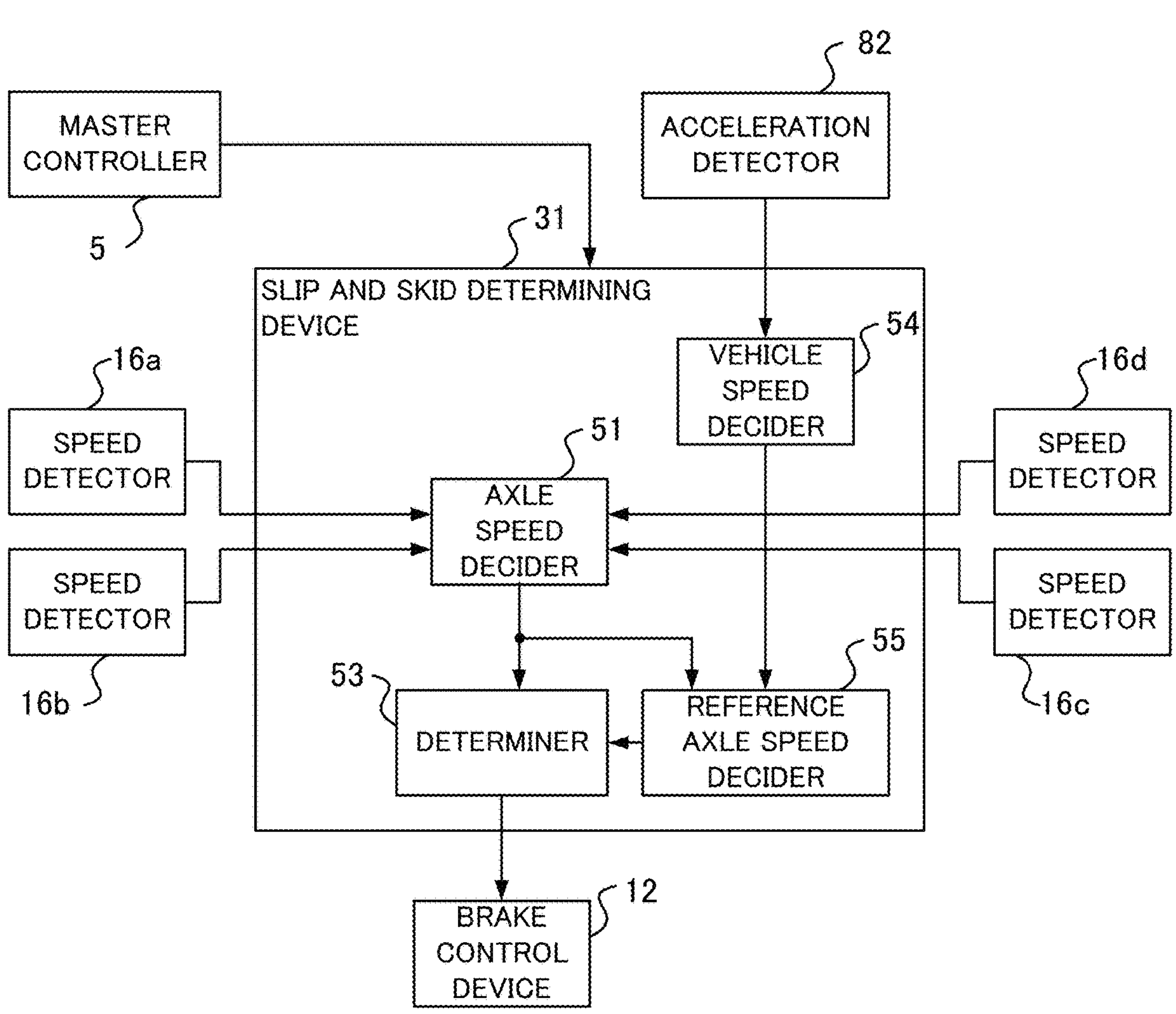
FIG. 9 is a block diagram illustrating the slip-and-skid determining device according to Embodiment 2.

The slip-and-skid determining device 31 in FIG. 9 includes a vehicle speed decider 54 that decides the speed of the vehicle 100 based on the measurement value of the acceleration of the vehicle 100 acquired from the acceleration detector 82, and a reference axle speed decider 55 that decides the reference axle speed based on the speed of the railway vehicle 2 and the axle speed of each of the axles 14*a*, 14*b*, 14*c*, and 14*d* determined by the axle speed decider 51. The slip-and-skid determining device 31 with the above structure has the same hardware configuration as in Embodiment 1.

Upon receiving an operation command from the master controller 5, the vehicle speed decider 54 repeatedly integrates the measurement value of the acceleration of the vehicle 100 acquired from the acceleration detector 82, and outputs the integral of the measured acceleration to the reference axle speed decider 55 as the speed of the vehicle 100. The speed of the vehicle 100 presumably matches the speed of the railway vehicle 2 including the vehicle 100.

The reference axle speed decider 55 decides the reference axle speed based on the axle speed of each of the axles 14*a*, 14*b*, 14*c*, and 14*d* decided by the axle speed decider 51 and the speed of the vehicle 100 decided by the vehicle speed decider 54. More specifically, the reference axle speed decider 55 selects a maximum value of speeds that are the axle speed of each of the axles 14*a*, 14*b*, 14*c*, and 14*d* decided by the axle speed decider 51 and the speed of the vehicle 100 decided by the vehicle speed decider 54, and outputs, as the reference axle speed, the maximum value to the determiner 53.

Figure 10:
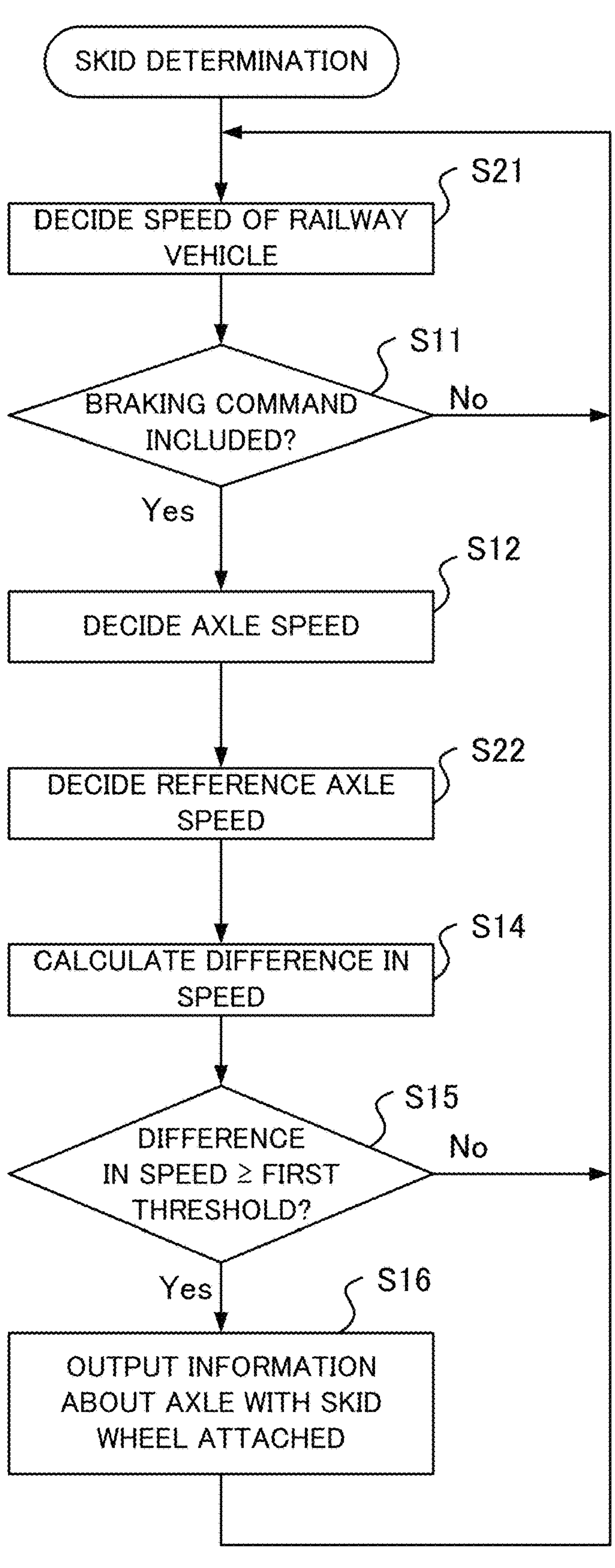
FIG. 10 is a flowchart illustrating exemplary steps of a skid determining process executed by the slip-and-skid determining device according to Embodiment 2.

The skid determining process performed by the slip-and-skid determining device 31 with the above structure is described with reference to FIG. 10. Upon receiving an operation command from the master controller 5, the slip-and-skid determining device 31 starts the process in FIG. 10. The vehicle speed decider 54 decides the speed of the vehicle 100 based on the measurement value of the acceleration of the vehicle 100 acquired from the acceleration detector 82 (step S21). The processing in steps S11 and S12 is the same as the processing in steps S11 and S12 performed by the slip-and-skid determining devices 13 and 23 in FIG. 5. When the received operation command does not include a braking command (No in step S11), the processing in step S21 and subsequent steps described above is repeated as illustrated in FIG. 10.

After step S12, the reference axle speed decider 55 decides, as the reference axle speed, the maximum value of speeds that are the axle speed of each axle decided in step S12 and the speed of the vehicle 100 decided in step S21 (step S22). The processing in subsequent steps S14 to S16 is the same as the processing in steps S14 to S16 performed by the slip-and-skid determining devices 13 and 23 in FIG. 5.

When all the wheels 15*a*, 15*b*, 15*c*, and 15*d* skid, the speed of the vehicle 100 does not decrease rapidly unlike the axle speed of each of the axles 14*a*, 14*b*, 14*c*, and 14*d*. When the railway vehicle 2 travels in a flat section and when all the wheels 15*a*, 15*b*, 15*c*, and 15*d* skid, for example, the speed of the railway vehicle 2 gradually decreases, causing the reference axle speed output from the reference axle speed decider 55 to decrease gradually. In this state, based on comparison between the axle speed of each of the axles 14*a*, 14*b*, 14*c*, and 14*d* and the reference axle speed, the occurrence of skid of the wheels 15*a*, 15*b*, 15*c*, and 15*d* can be determined.

As described above, the slip-and-skid determining device 31 according to Embodiment 2 decides the reference axle speed based on the axle speed of each of the axles 14*a*, 14*b*, 14*c*, and 14*d* in the vehicle 100 and the speed of the vehicle 100. This prevents the reference axle speed from decreasing rapidly unlike the axle speed of each of the axles 14*a*, 14*b*, 14*c*, and 14*d*, although all the wheels 15*a*, 15*b*, 15*c*, and 15*d* attached to the axles 14*a*, 14*b*, 14*c*, and 14*d* in the vehicle 100 skid. This allows determination of the occurrence of a skid of any wheel based on the difference between each axle speed and the reference axle speed.

Embodiment 3

The method for deciding the reference axle speed based on each axle speed and the physical quantity that changes during the travel of the railway vehicle is not limited to the examples described above. A slip-and-skid determining device according to Embodiment 3 determines the reference axle speed with a method different from the methods in Embodiments 1 and 2, and is thus described focusing on differences from the methods in Embodiments 1 and 2.

Figure 11:
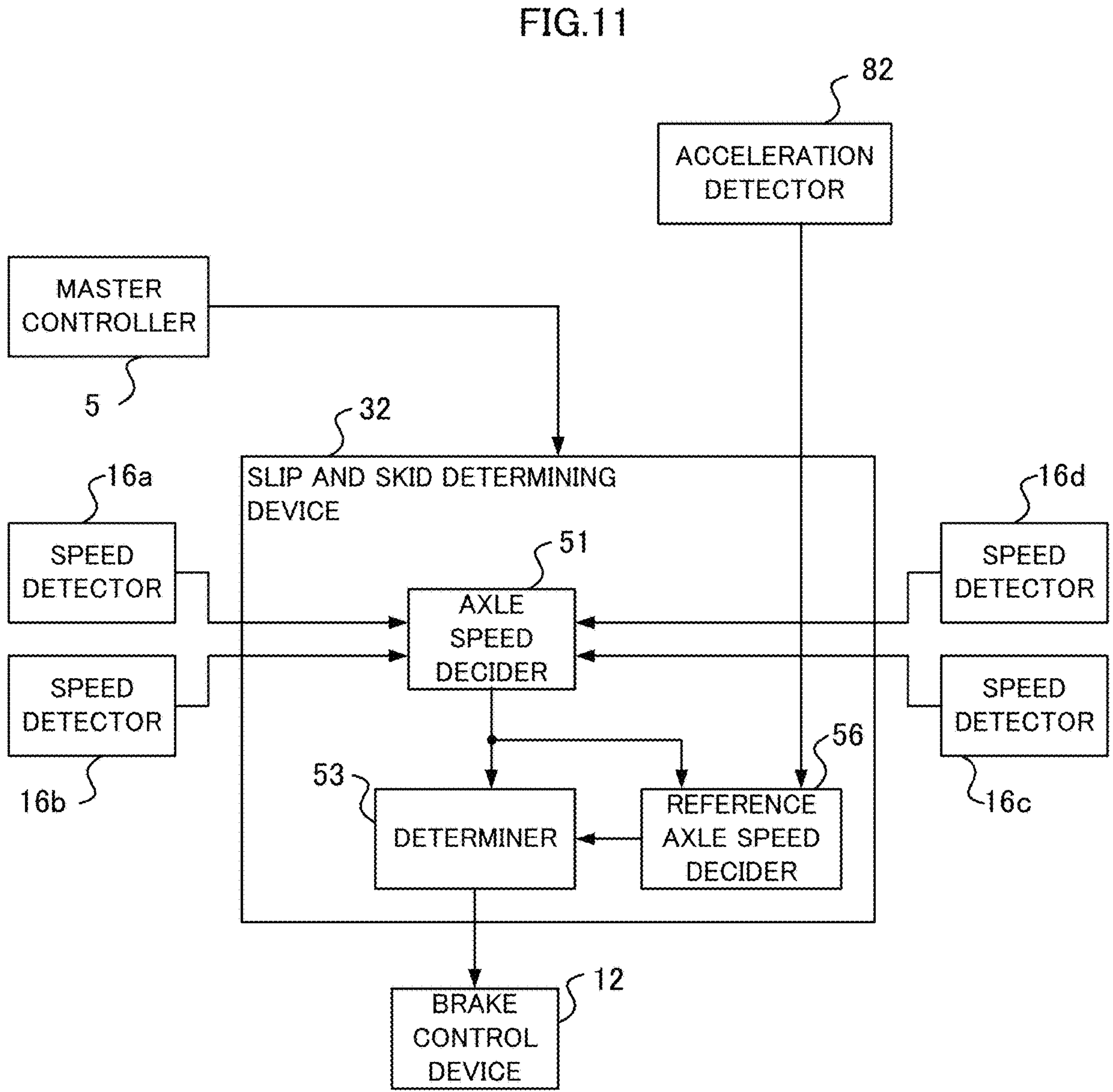
FIG. 11 is a block diagram illustrating a slip-and-skid determining device according to Embodiment 3.

In FIG. 11, a slip-and-skid determining device 32 according to Embodiment 3 is mounted on the vehicle 100, similarly to the slip-and-skid determining device 31 according to Embodiment 2. The slip-and-skid determining device 32 includes a reference axle speed decider 56 that decides the reference axle speed based on the axle speed of each of the axles 14*a*, 14*b*, 14*c*, and 14*d* decided by the axle speed decider 51, and the acceleration of the railway vehicle 1. The slip-and-skid determining device 32 with the above structure has the same hardware configuration as in Embodiment 1.

The reference axle speed decider 56 decides the reference axle speed that maintains the rate of change in the reference axle speed within a target range. More specifically, the reference axle speed decider 56 decides the reference axle speed that maintains the rate of change in the reference axle speed within the target range defined based on the acceleration of the railway vehicle 1. The acceleration of the vehicle

100 can be used as the acceleration of the railway vehicle 2. Thus, the reference axle speed decider 56 decides the reference axle speed to maintain the rate of change in the reference axle speed within the target range defined based on the measurement value of the acceleration of the vehicle 100 acquired from the acceleration detector 82.

Figure 12:
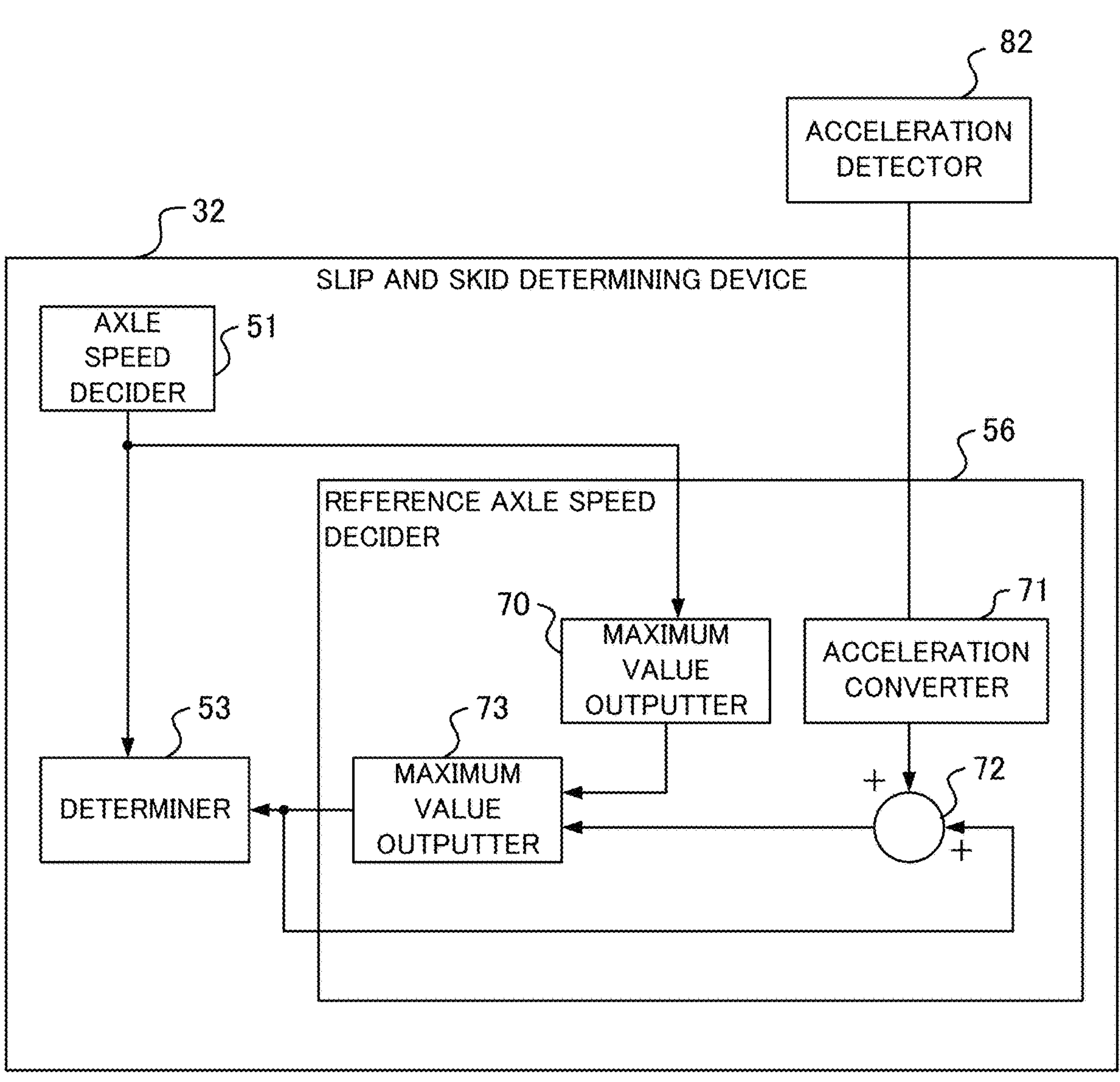
FIG. 12 is a block diagram illustrating a reference axle speed decider in Embodiment 3.

As illustrated in FIG. 12, the reference axle speed decider 56 includes a maximum value outputter 70 that outputs the maximum value of the axle speed and an acceleration converter 71 that converts the acceleration of the vehicle 100 acquired from the acceleration detector 82 to a change in the speed of the vehicle 100 in a calculation cycle. The calculation cycle corresponds to an interval at which the reference axle speed decider 56 repeats deciding the reference axle speed, and is thus determined based on a period of time taken for deciding the reference axle speed. The calculation cycle is, for example, one second.

The reference axle speed decider 56 includes an adder 72 that adds a value output from the acceleration converter 71 to the most recently decided reference axle speed, and a maximum value outputter 73 that outputs a maximum value of values output from the maximum value outputter 70 and from the adder 72.

The maximum value outputter 70 outputs, to the maximum value outputter 73, the maximum value of the axle speed of each of the axles 14*a*, 14*b*, 14*c*, and 14*d* acquired from the axle speed decider 51.

When the measurement value of the acceleration of the vehicle 100 acquired from the acceleration detector 82 indicates a change in the speed of the railway vehicle 1 per second (in km/h/s) and the calculation cycle for the reference axle speed decider 56 is one second, the acceleration converter 71 outputs the measurement value of the acceleration of the vehicle 100 acquired from the acceleration detector 82 to the adder 72 as the change in the speed (in km/h) of the vehicle 100 in the calculation cycle.

The adder 72 adds the value (in km/h) output from the acceleration converter 71 to the reference axle speed (in km/h) most recently output from the maximum value outputter 73. The value output from the adder 72 corresponds to the axle speed of each of the axles 14*a*, 14*b*, 14*c*, and 14*d* that can be achieved when no skid occurs.

The maximum value outputter 73 outputs the maximum value of values output from the maximum value outputter 70 and from the adder 72. When all the wheels 15*a*, 15*b*, 15*c*, and 15*d* attached to the axles 14*a*, 14*b*, 14*c*, and 14*d* skid, the axle speed of each of the axles 14*a*, 14*b*, 14*c*, and 14*d* decreases rapidly. This causes the value output from the maximum value outputter 70 to decrease rapidly and fall below the value output from the adder 72. The maximum value outputter 73 then outputs, as the reference axle speed, the value output from the adder 72 to the determiner 53.

Although all the wheels 15*a*, 15*b*, 15*c*, and 15*d* skid, the reference axle speed decider 56 outputs the reference axle speed corresponding to the axle speed of each of the axles 14*a*, 14*b*, 14*c*, and 14*d* that can be achieved when no skid occurs. This allows the determiner 53 to determine, based on the difference between the axle speed of each of the axles 14*a*, 14*b*, 14*c*, and 14*d* and the reference axle speed, whether any skid of any wheel occurs.

As described above, the slip-and-skid determining device 32 according to Embodiment 3 changes the reference axle speed that maintains the rate of change in the reference axle speed within the target range, or more specifically, within the target range defined in accordance with the acceleration of the vehicle 100. This prevents the reference axle speed from decreasing rapidly unlike the axle speed of each of the axles 14*a*, 14*b*, 14*c*, and 14*d* in the vehicle 100, although all the wheels 15*a*, 15*b*, 15*c*, and 15*d* attached to the axles 14*a*, 14*b*, 14*c*, and 14*d* skid, thus allowing determination of the occurrence of a skid of any wheel based on the difference between each axle speed and the reference axle speed.

Embodiment 4

To determine whether any slip or a skid in the vehicle, the determination may be performed based on the acceleration of the railway vehicle, in addition to comparison between each axle speed and the reference axle speed. A slip-and-skid determining device according to Embodiment 4 determines whether any skid occurs with a method different from the methods in Embodiments 1 to 3, and is thus described focusing on differences from the methods in Embodiments 1 to 3.

Figure 13:
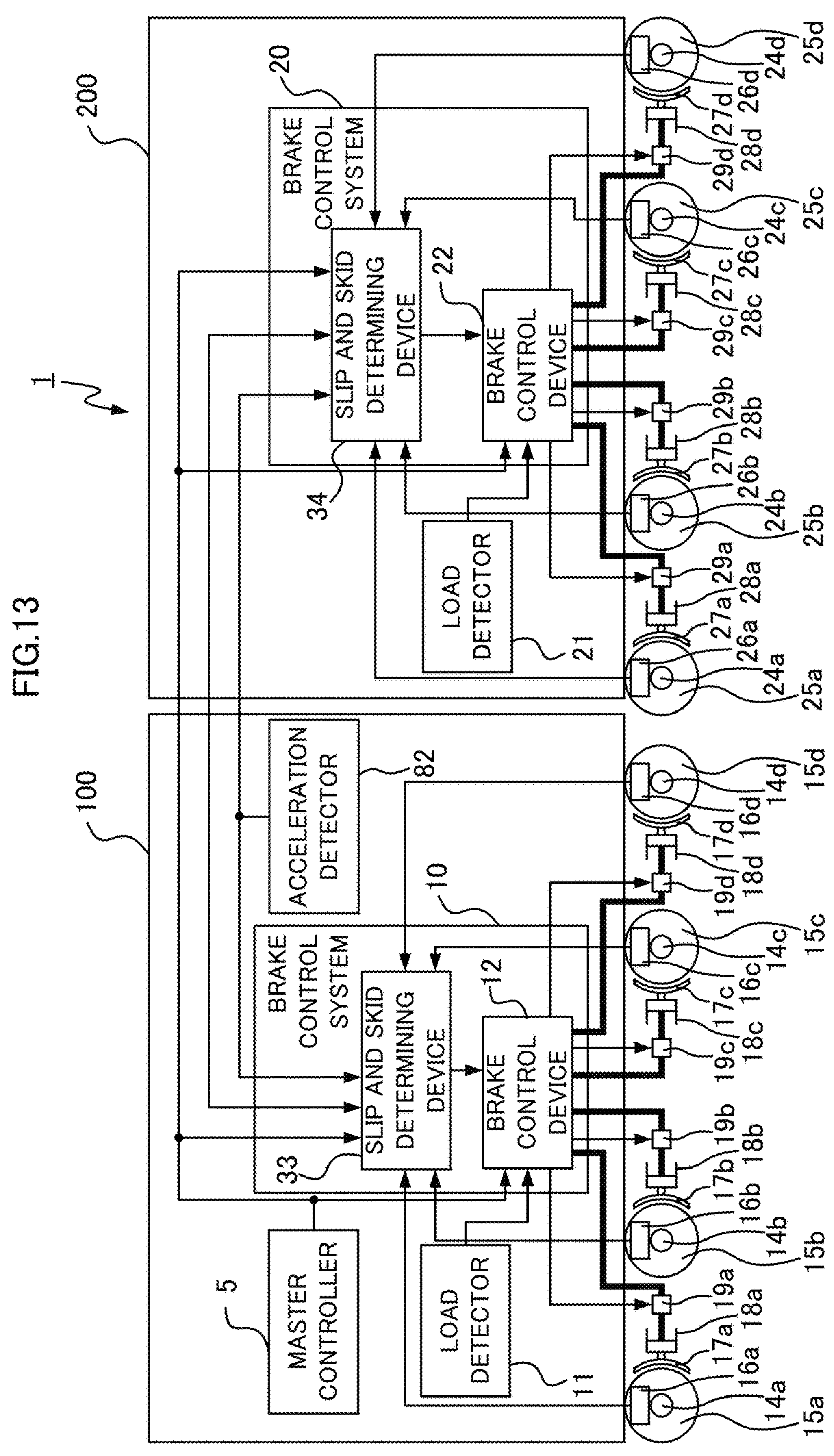
FIG. 13 illustrating a railway vehicle provided with a slip-and-skid determining device according to Embodiment 4.

In FIG. 13, the vehicle 100 includes a slip-and-skid determining device 33, and the vehicle 200 includes a slip-and-skid determining device 34. The vehicle 100 includes the acceleration detector 82. The acceleration detector 82 transmits data indicating the measurement value of the acceleration of the vehicle 100 to the slip-and-skid determining devices 33 and 34. The acceleration of the vehicle 100 can correspond to the acceleration of the railway vehicle 1 including the vehicles 100 and 200.

Figure 14:
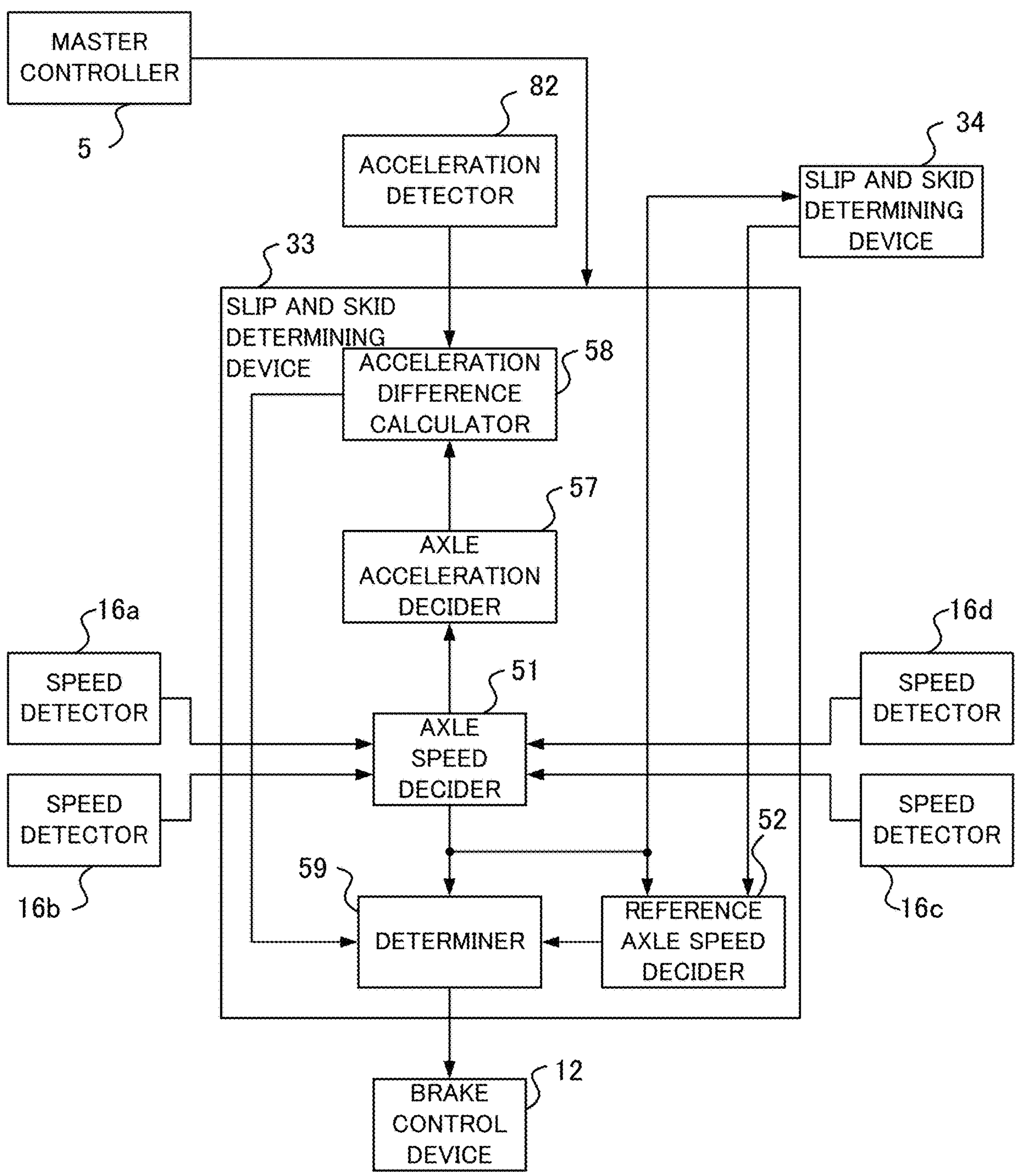
FIG. 14 is a block diagram illustrating the slip-and-skid determining device according to Embodiment 4.

The slip-and-skid determining devices 33 and 34 have the same structure. The structure of the slip-and-skid determining device 33 is thus described below. In FIG. 14, the slip-and-skid determining device 33 includes an axle acceleration decider 57 that decides each axle acceleration as the circumferential acceleration of the corresponding wheel 15*a*, 15*b*, 15*c*, or 15*d*, an acceleration difference calculator 58 that decides a difference between each axle acceleration and the acceleration of the railway vehicle 1, and a determiner 59 that determines whether any skid of any of the wheels 15*a*, 15*b*, 15*c*, and 15*d* occurs based on comparison between each axle speed and the reference axle speed or comparison between each axle acceleration and the acceleration of the railway vehicle 1. The slip-and-skid determining devices 33 and 34 with the above structure have the same hardware configuration as in Embodiment 1.

The axle acceleration decider 57 acquires the axle speed of each of the axles 14*a*, 14*b*, 14*c*, and 14*d* from the axle speed decider 51, and decides the axle acceleration (in km/h/s) for each of the axles 14*a*, 14*b*, 14*c*, and 14*d* based on a change in the corresponding axle speed per unit time. The axle acceleration decider 57 outputs each axle acceleration to the acceleration difference calculator 58.

The acceleration difference calculator 58 calculates the difference between the measurement value of the acceleration of the vehicle 100 acquired from the acceleration detector 82 and the axle acceleration of each of the axles 14*a*, 14*b*, 14*c*, and 14*d*, and outputs the calculated difference in acceleration to the determiner 59. Each difference in acceleration indicates an absolute value of the difference between the measurement value of the acceleration of the vehicle 100 and each axle acceleration.

The determiner 59 determines whether any skid occurs, based on the difference between each axle speed and the reference axle speed or based on each difference in acceleration. The determination based on the difference between each axle speed and the reference axle speed is performed as in Embodiment 1. More specifically, as in Embodiment 1, the determiner 59 determines whether the difference between each axle speed and the reference axle speed is greater than or equal to the first threshold. When any of the differences in speed is greater than or equal to the first threshold, the corresponding axle speed is sufficiently lower than the reference axle speed. In this state, occurrence of a skid can be determined.

The determination of a skid based on each difference in acceleration is described. The determiner 59 determines whether each difference in acceleration acquired from the acceleration difference calculator 58 is greater than or equal to a second threshold. The second threshold is defined based on a difference between the acceleration of the railway vehicle 1 and each axle speed generated when a skid occurs during, for example, the test driving or simulation of the railway vehicle 1. When any of the differences in acceleration is greater than or equal to the second threshold, the corresponding axle acceleration is sufficiently lower than the acceleration of the vehicle 100. In this state, a skid can be detected.

Figure 15:
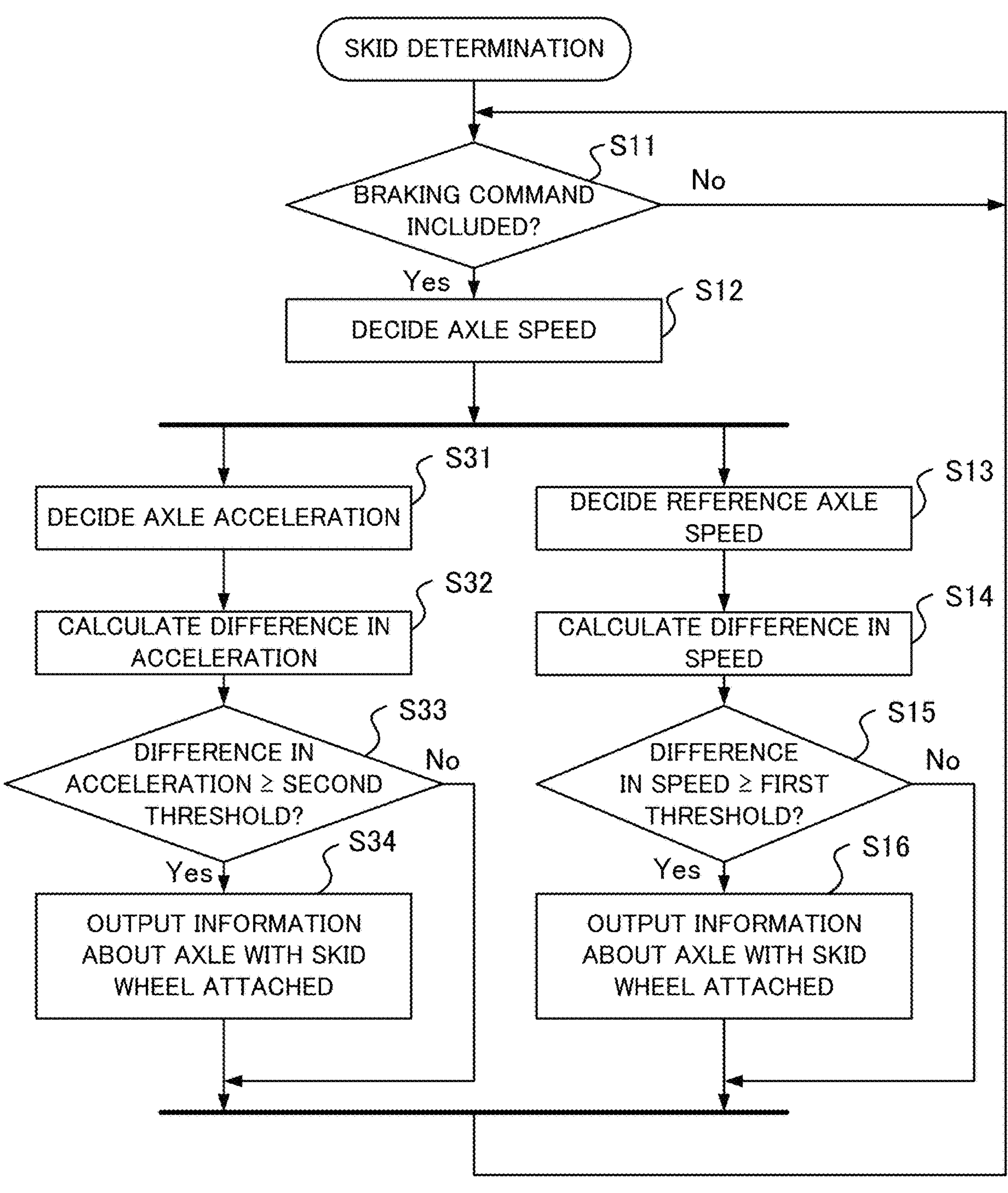
FIG. 15 is a flowchart illustrating exemplary steps of a skid determining process executed by the slip-and-skid determining device according to Embodiment 4.

The slip-and-skid determining devices 33 and 34 with the above structure perform the skid determining process in the same manner. Thus, the skid determining process performed by the slip-and-skid determining device 33 is described with reference to FIG. 15. Upon receiving an operation command from the master controller 5, the slip-and-skid determining device 33 starts the process in FIG. 15. The processing in steps S11 and S12 is the same as the processing in steps S11 and S12 performed by the slip-and-skid determining device 13 according to Embodiment 1 in FIG. 5.

The axle acceleration decider 57 decides each axle acceleration based on the corresponding axle speed decided in step S12 (step S31). The acceleration difference calculator 58 calculates the difference in acceleration based on each axle acceleration decided in step S31 and the measurement value of the acceleration of the vehicle 100 acquired from the acceleration detector 82 (step S32). The determiner 59 determines whether the difference in acceleration calculated in step S32 is greater than or equal to the second threshold.

When at least any of the differences in acceleration calculated in step S32 is greater than or equal to the second threshold (Yes in step S33), the determiner 59 outputs, to the brake control device 12, information about the axle 14*a*, 14*b*, 14*c*, or 14*d* having an axle acceleration that has a difference from the acceleration of the vehicle 100 greater than or equal to the second threshold, in other words, information about any one of the axles 14*a*, 14*b*, 14*c*, and 14*d* to which the skid wheel 15*a*, 15*b*, 15*c*, or 15*d* is attached (step S34). When the processing in step S34 ends, the processing in step S11 and subsequent steps described above is repeated.

When all the differences in acceleration calculated in step S32 are less than the second threshold (No in step S33), the processing in step S11 and subsequent steps described above is repeated without the processing in step S34 being performed.

While the processing in steps S31 to S34 is being performed, the processing in steps S13 to S16 is performed in parallel. The processing in steps S13 to S16 is the same as the processing in steps S13 to S16 performed by the slip-and-skid determining device 13 according to Embodiment 1 in FIG. 5.

As described above, the slip-and-skid determining device 33 according to Embodiment 4 determines whether any skid occurs based on comparison between the axle acceleration of each of the axles 14*a*, 14*b*, 14*c*, and 14*d* in the vehicle 100 and the acceleration of the vehicle 100, in addition to being based on comparison between the axle speed of each of the axles 14*a*, 14*b*, 14*c*, and 14*d* and the reference axle speed decided based on the axle speed of each of the axles 24*a*, 24*b*, 24*c*, and 24*d* in the vehicle 200.

The slip-and-skid determining device 33 determines that a skid occurs when any of the differences in acceleration is greater than or equal to the second threshold or when any of the differences in speed is greater than or equal to the first threshold. This allows determination of the occurrence of a skid more accurately and more quickly than in Embodiments 1 to 3.

Embodiment 5

The slip-and-skid determining devices described above can determine the occurrence of a slip in addition to a skid. A slip-and-skid determining device according to Embodiment 5 determines the occurrence of a skid and a slip, and is described focusing on differences from Embodiment 1.

Figure 16:
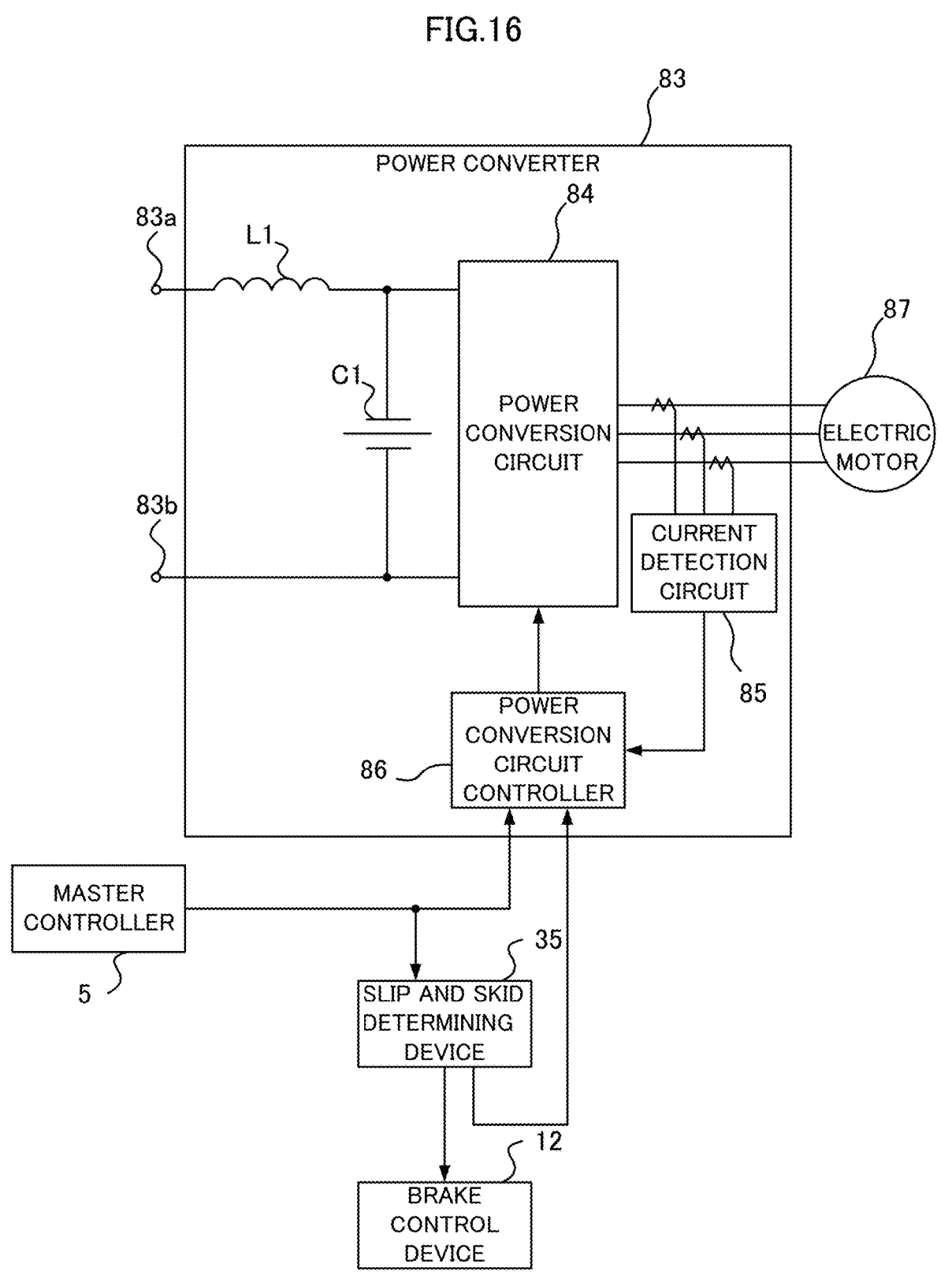

The vehicle 100 includes a power converter 83 illustrated in FIG. 16 as a drive device for the railway vehicle 1, an electric motor 87 that operates on power supplied from the power converter 83 to generate a driving force for the railway vehicle 1, and a slip-and-skid determining device 35 that determines the occurrence of a slip or a skid.

The power converter 83 is, for example, a direct current (DC)-three-phase converter mounted on the railway vehicle 1 using a DC feeder, and converts DC power supplied from a power supply, which is not illustrated, to three-phase alternating current (AC) power to supply the three-phase AC power to a load. The power converter 83 includes an input terminal 83*a* to be connected to the power supply and an input terminal 83*b* to be grounded. The power converter 83 further includes a power conversion circuit 84 that converts DC power supplied from the power supply to three-phase AC power and supplies the three-phase AC power to the electric motor 87, a current detection circuit 85 that measures the phase current output from the power conversion circuit 84, and a power conversion circuit controller 86 that controls the power conversion circuit 84. The power converter 83 still further includes a reactor L1 and a capacitor C1. The reactor L1 and the capacitor C1 are connected in series between the input terminals 83*a* and 83*b*. The power converter 83 with the above structure is located under the floor of the vehicle 100 as a motor coach.

The input terminal 83*a* is electrically connected to the power supply, or more specifically, to a current collector through a contactor or a circuit breaker, which are not illustrated. The current collector acquires power supplied from a substation through a power supply line. Examples of the current collector include a pantograph for acquiring the power through an overhead line as an example of a power supply line and a current collecting shoe for acquiring the power through a third rail as an example of a power supply line. The input terminal 83*b* is grounded with, for example, a ground ring, a ground brush, or the wheels, which are not illustrated.

The power conversion circuit 84 is, for example, an inverter that varies the effective voltage and the frequency of the output AC power. The power conversion circuit 84 includes multiple switching elements. Each switching element switches under control of the power conversion circuit controller 86. Each switching element is, for example, an insulated-gate bipolar transistor (IGBT).

The current detection circuit 85 includes a current transformer (CT) attached to a busbar that electrically connects the power conversion circuit 84 and the electric motor 87. The current detection circuit 85 measures the phase current, or more specifically, a U-phase current, a V-phase current, and a W-phase current output from the power conversion circuit 84. The current detection circuit 85 transmits the measurement value of each phase current to the power conversion circuit controller 86.

The power conversion circuit controller 86 acquires an operation command from the master controller 5. The power conversion circuit controller 86 generates a power conversion control signal for controlling each switching element in the power conversion circuit 84 in accordance with the operation command and the determination result from the slip-and-skid determining device 35, and outputs the power conversion control signal to the power converter circuit 84. The power conversion control signal is, for example, a pulse width modulation (PWM) signal.

The reactor L1 has one end connected to the input terminal 83*a*. The reactor L1 has the other end connected to a primary terminal of the power conversion circuit 84. The capacitor C1 has one end connected to the connecting point between the other end of the reactor L1 and the primary terminal of the power conversion circuit 84. The capacitor C1 has the other end connected to the connecting point between the input terminal 83*b* and the primary terminal of the power conversion circuit 84. The reactor L1 and the capacitor C1 are included in an LC filter for attenuating harmonic components resulting from the switching operation performed by the power conversion circuit 84.

The electric motor 87 is mounted on the bogie supporting the vehicle body of the vehicle 100. When the electric motor 87 operates on power supplied from the power converter 83, the shaft of the electric motor 87 rotates. The rotational force of the shaft is transmitted to the axles 14*a*, 14*b*, 14*c*, and 14*d* through a joint and a gear device. More specifically, the vehicle 100 includes two bogies for supporting the vehicle body. Each bogie includes two electric motors 87. The rotational force of the shafts in the electric motors 87 on one bogie is transmitted to the axles 14*a* and 14*b*, and the rotational force of the shafts in the electric motors 87 on the other bogie is transmitted to the axles 14*c* and 14*d*. In response to the rotation of the axles 14*a*, 14*b*, 14*c*, and 14*d*, the wheels 15*a*, 15*b*, 15*c*, and 15*d* each attached to both ends of the corresponding axle 14*a*, 14*b*, 14*c*, or 14*d* rotate as well. This generates the driving force of the railway vehicle 1.

Figure 17:
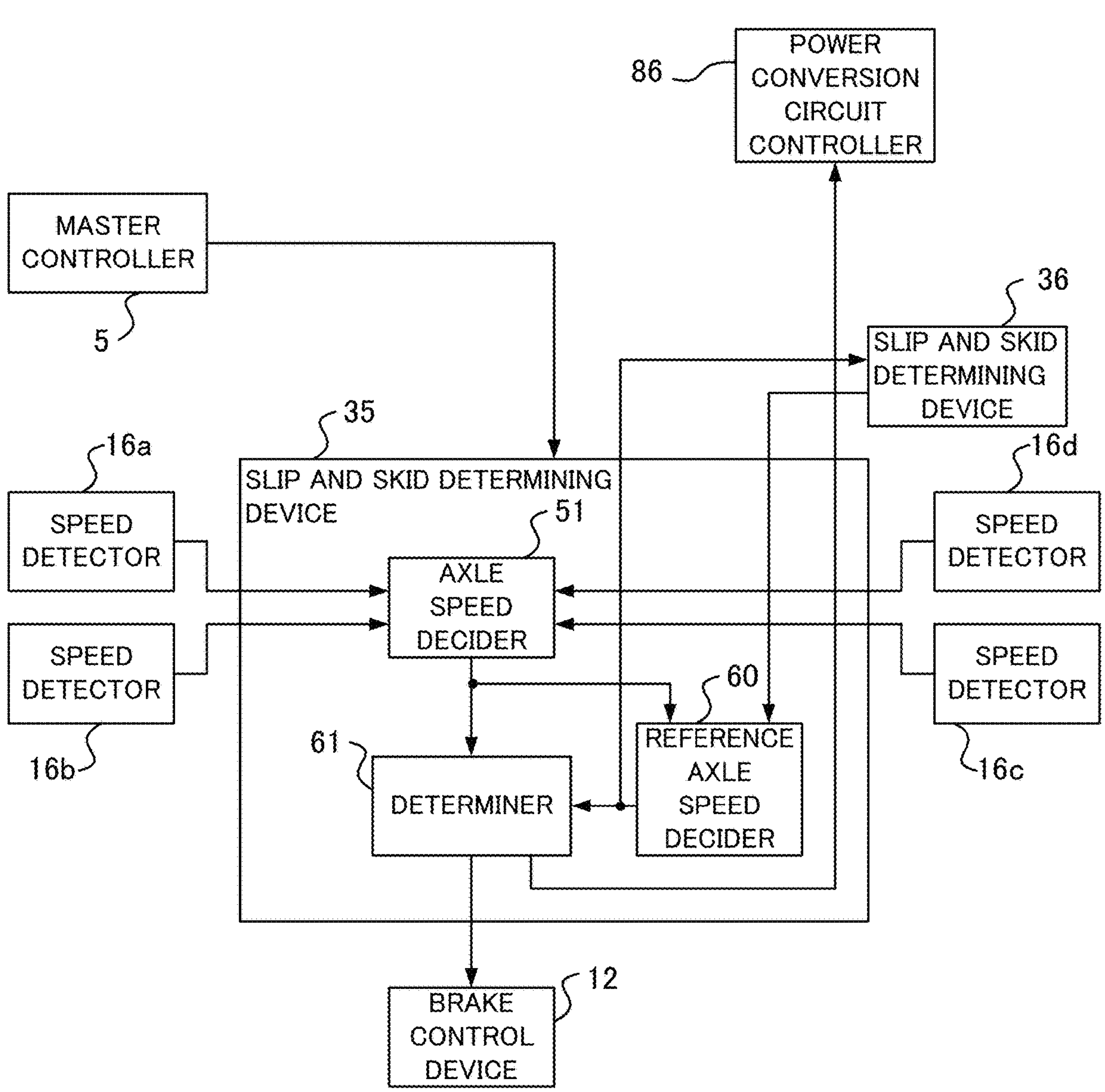
FIG. 17 is a block diagram illustrating a slip-and-skid determining device according to Embodiment 5.

The slip-and-skid determining device 35 in FIG. 17 acquires the reference axle speed from a slip-and-skid determining device 36 in the vehicle 200. The slip-and-skid determining devices 35 and 36 have the same structure. Thus, the slip-and-skid determining device 35 that determines whether any slip or skid of any wheel occurs is described. The slip-and-skid determining device 35 includes a reference axle speed decider 60 and a determiner 61. The reference axle speed decider 60 decides, in response to an operation command, the reference axle speed based on each axle speed decided by the axle speed decider 51 and the reference axle speed acquired from the slip-and-skid determining device 36. The determiner 61 determines whether any slip or skid occurs based on comparison between each axle speed and the reference axle speed. The slip-and-skid determining devices 35 and 36 with the above structure have the same hardware configuration as in Embodiment 1.

Figure 18:
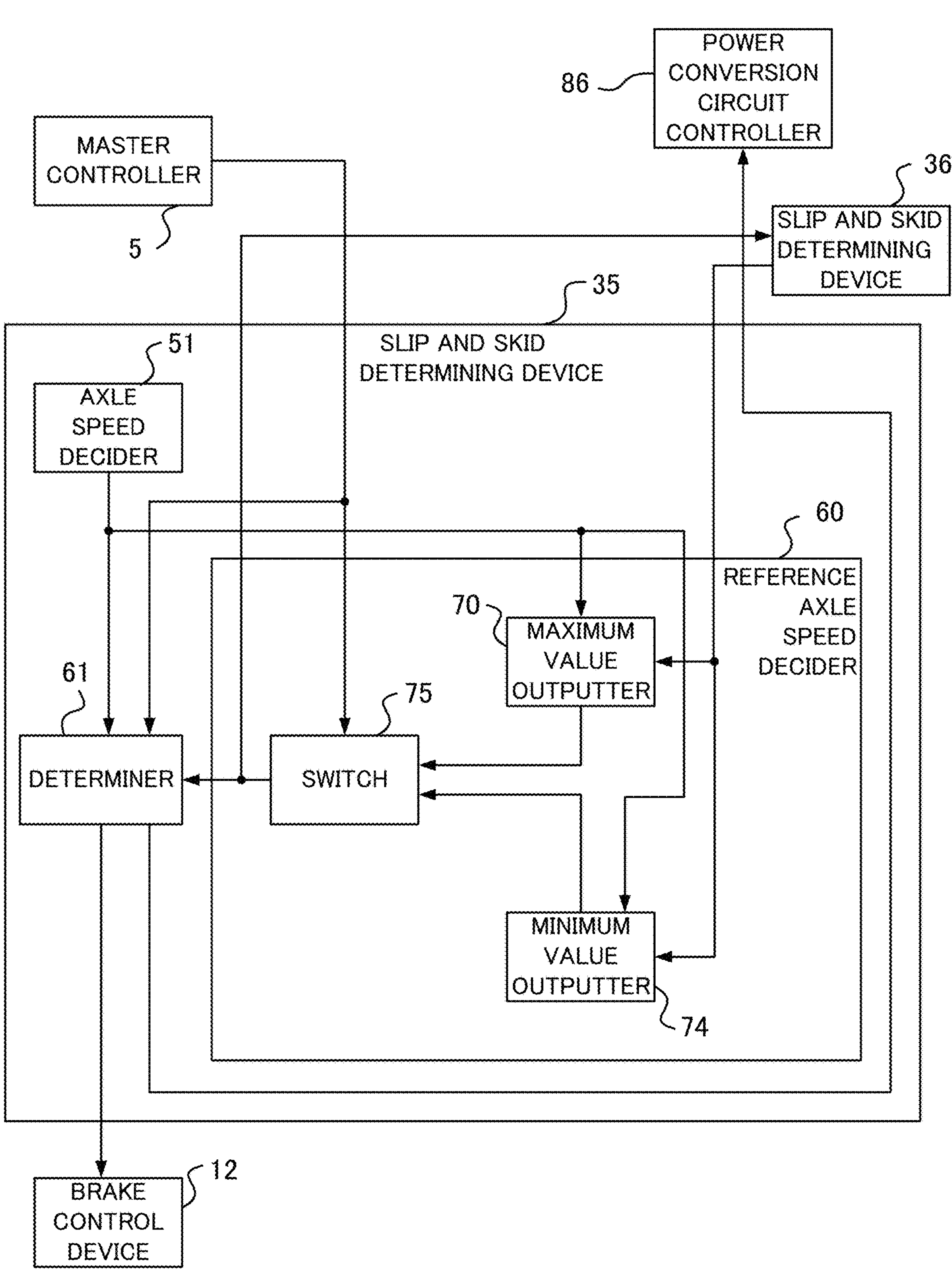
FIG. 18 is a block diagram illustrating a reference axle speed decider in Embodiment 5.

The reference axle speed decider 60 in FIG. 18 includes the maximum value outputter 70 that outputs a maximum value of the axle speed, a minimum value outputter 74 that outputs a minimum value of the axle speed, and a switch 75 that outputs the value output from the maximum value outputter 70 or the value output from the minimum value outputter 74 in response to an operation command.

The maximum value outputter 70 acquires the axle speed of each of the axles 14*a*, 14*b*, 14*c*, and 14*d* from the axle speed decider 51, and outputs the maximum value in the acquired axle speed to the switch 75.

The minimum value outputter 74 acquires the axle speed of each of the axles 14*a*, 14*b*, 14*c*, and 14*d* from the axle speed decider 51, and outputs the minimum value in the acquired axle speed to the switch 75.

When the operation command acquired from the master controller 5 includes a braking command, the switch 75 outputs, as the reference axle speed, the value output from the maximum value outputter 70 to the determiner 61 and to the slip-and-skid determining device 36. When the operation command does not include a braking command, or in other words, when the operation command includes a powering command or a coasting command, the switch 75 outputs, as the reference axle speed, the value output from the minimum value outputter 74 to the determiner 61 and to the slip-and-skid determining device 36.

When the operation command includes a braking command, the determiner 61 calculates a difference between each axle speed acquired from the axle speed decider 51 and the reference axle speed acquired from the reference axle speed decider 60, and determines whether each difference in speed is greater than or equal to the first threshold. Each difference in speed indicates an absolute value of the difference between the corresponding axle speed and the reference axle speed. When any of the differences in speed is greater than or equal to the first threshold, the corresponding axle speed is sufficiently lower than the reference axle speed. In this state, occurrence of a skid can be determined. When each difference in speed is less than the first threshold, no occurrence of skid of the wheels 15*a*, 15*b*, 15*c*, and 15*d* is determined. The determiner 61 transmits the above determination result to the brake control device 12.

When the operation command does not include a braking command, the determiner 61 calculates the difference between each axle speed acquired from the axle speed decider 51 and the reference axle speed acquired from the reference axle speed decider 60, and determines whether each difference in speed is greater than or equal to a third threshold. Each difference in speed indicates an absolute value of the difference between the corresponding axle speed and the reference axle speed. The third threshold is defined based on a difference between the reference axle speed and each axle speed generated when a slip occurs in, for example, the test driving or simulation of the railway vehicle 1. When any of the differences in speed is greater than or equal to the third threshold, the corresponding axle speed is sufficiently higher than the reference axle speed. In this state, occurrence of a slip can be determined. When each difference in speed is less than the third threshold, no occurrence of slip of the wheels 15*a*, 15*b*, 15*c*, and 15*d* is determined.

The determiner 61 transmits the above determination result to the power conversion circuit controller 86. When any of the differences in speed is greater than or equal to the third threshold, for example, the determiner 61 transmits a notice of a slip to the power conversion circuit controller 86.

A power conversion process performed by the power converter 83 with the above structure in FIG. 16 is described below. When the operation command includes a powering command, the power converter 83 converts the DC power supplied from the power supply to the three-phase AC power, and supplies the three-phase AC power to the electric motor 87. The electric motor 87 operates on the supplied three-phase AC power to generate the driving force of the railway vehicle 1.

More specifically, when the operation command includes a powering command, the power conversion circuit controller 86 decides a torque command value τ* as a target torque for the electric motor 87 in accordance with the target acceleration indicated by the powering command as a target value for the acceleration of the railway vehicle 1 and the measurement value of the rotational speed of the electric motor 87 acquired from a speed detector, which is not illustrated. The power conversion circuit controller 86 decides an exciting current command value id* and a torque current command value iq* in accordance with the torque command value τ*. To decide an exciting current value id and a torque current value iq, the power conversion circuit controller 86 converts, for the measurement value of the phase current acquired from the current detection circuit 85, three-phase coordinates to dq rotational coordinates based on an estimated position θ estimated from the measurement value of the rotational speed of the electric motor 87.

The power conversion circuit controller 86 decides an exciting voltage command value Vd* based on a difference between the exciting current value id and the exciting current command value id*, and decides a torque voltage command value Vq* based on a difference between the torque current value iq and the torque current command value iq*. To decide a U-phrase voltage command value Vu*, a V-phase voltage command value Vv*, and a W-phase voltage command value Vw*, the power conversion circuit controller 86 converts, for the exciting voltage command value Vd* and the torque voltage command value Vq*, the dq rotational coordinates to the three-phase coordinates based on the estimated position θ. The power conversion circuit controller 86 then generates and outputs the power conversion control signal for controlling the switching of each switching element in the power conversion circuit 84 based on each of the U-phase voltage command value Vu*, the V-phase voltage command value Vv*, and the W-phase voltage command value Vw* and the corresponding carrier wave.

Upon receiving the notice of a slip from the slip-and-skid determining device 35, the power conversion circuit controller 86 sets the torque command value τ* to a smaller value than the above torque command value τ* decided in accordance with the target acceleration of the railway vehicle 1 indicated by the powering command and the measurement value of the rotational speed of the electric motor 87 as described above. The power conversion circuit controller 86 performs the above process based on the torque command value τ* set to the smaller value, and generates the power conversion control signal.

When the power conversion control signal is provided to a gate terminal for each switching element in the power conversion circuit 84, the corresponding switching element performs a switching operation. This allows the power conversion circuit 84 to convert the DC power to the three-phase AC power and supply the three-phase AC power to the electric motor 87.

When the operation command includes a braking command, the electric motor 87 operating as a power generator supplies the three-phase AC power to the power converter 83. The power converter 83 converts the three-phase AC power supplied from the electric motor 87 to the DC power, and supplies the DC power through the current collector and the power supply line to other railway vehicles traveling near the railway vehicle 1 including the power converter 83. The three-phase AC power generated by the electric motor 87 is supplied to and consumed in the other railway vehicles. This generates a regenerative brake force for decelerating the railway vehicle 1.

More specifically, when the operation command includes a braking command, the power conversion circuit controller 86 acquires the measurement value of the voltage between terminals of the capacitor C1 from a voltage sensor, which is not illustrated, and acquires, from the current detection circuit 85, the measurement value of each phase current flowing from the electric motor 87 to the power converter circuit 84. Based on the measurement value of the voltage between terminals in the capacitor C1 and the measured phase current flowing from the electric motor 87 to the power converter circuit 84, the power conversion circuit controller 86 determines a voltage command value as a target value for the voltage output from the power converter circuit 84.

The target value for the voltage output from the power conversion circuit 84 is included within a target range of, for example, voltages greater than the overhead voltage and voltages with which the regenerative brake can be provided. The power conversion circuit controller 86 then generates, in accordance with the voltage command value, the power conversion control signal for controlling the switching of each switching element in the power conversion circuit 84, and outputs the power conversion control signal.

When the power conversion control signal is provided to a gate terminal for each switching element in the power conversion circuit 84, the corresponding switching element performs a switching operation. This allows the power conversion circuit 84 to convert the three-phase AC power supplied from the electric motor 87 to the DC power and charge the capacitor C1 with the DC power.

As described above, when the other railway vehicles are accelerating near the railway vehicle 1 including the power converter 83, the power generated by the electric motor 87 is supplied to and consumed in the other railway vehicles. This generates a regenerative brake force for decelerating the railway vehicle 1.

Figure 19:
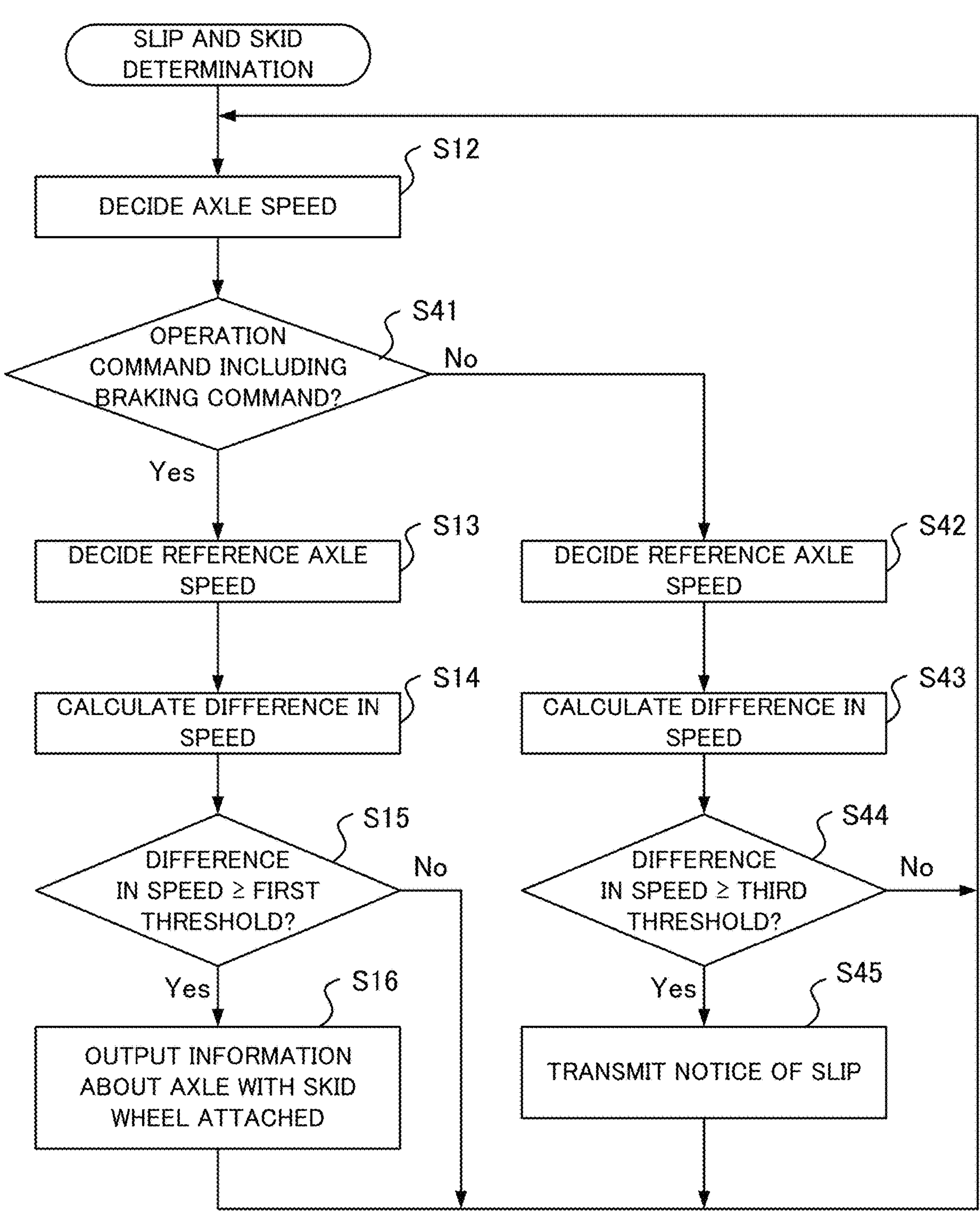
FIG. 19 is a flowchart illustrating exemplary steps of a slip-and-skid determining process executed by the slip-and-skid determining device according to Embodiment 5.

The slip-and-skid determining devices 35 and 36 perform a slip and skid determination process in the same manner. Thus, the slip determination process performed by the slip-and-skid determining device 35 is described with reference to FIG. 19. Upon receiving an operation command from the master controller 5, the slip-and-skid determining device 35 starts the process in FIG. 19.

Figure 5:
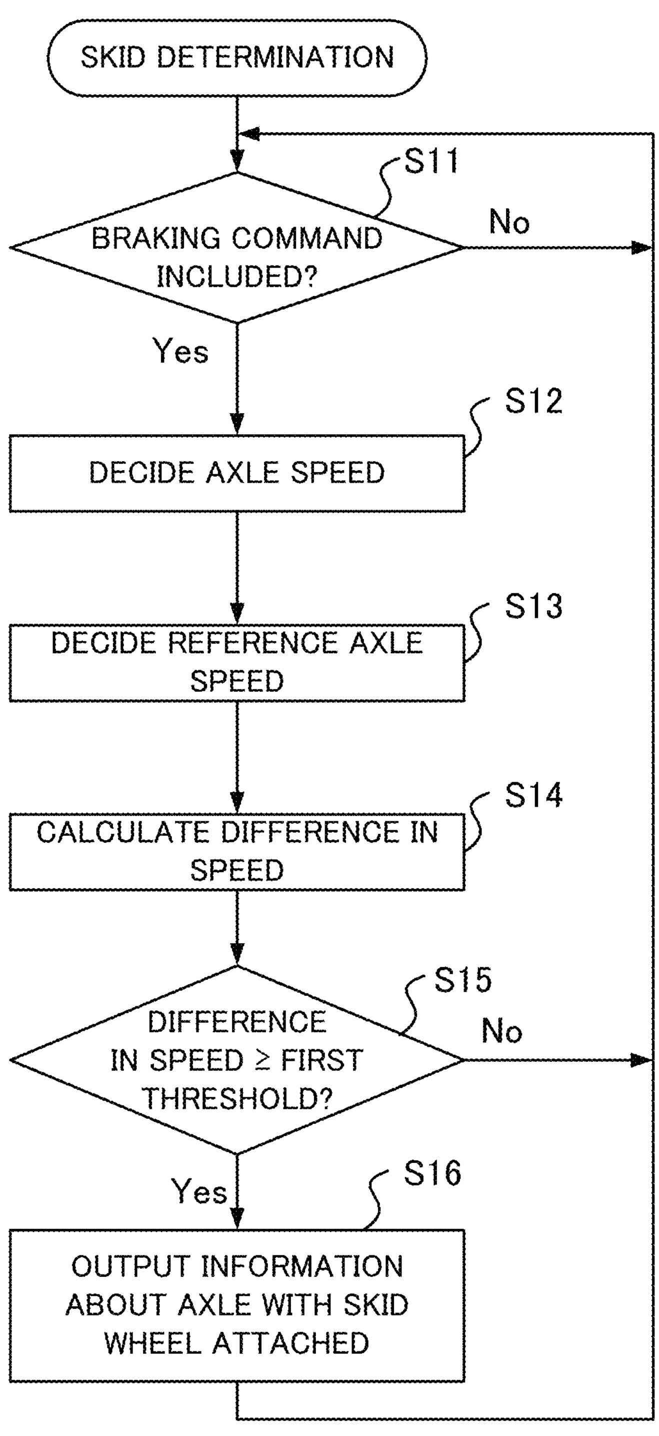
FIG. 5 is a flowchart illustrating exemplary steps of a skid determining process executed by the slip-and-skid determining device according to Embodiment 1.

The processing in step S12 is the same as the processing in step S12 performed by the slip-and-skid determining device 13 according to Embodiment 1 in FIG. 5. When the received operation command includes a braking command (Yes in step S41), the processing in steps S13 to S16 is performed. The processing in steps S13 to S16 is the same as the processing in steps S13 to S16 performed by the slip-and-skid determining device 13 according to Embodiment 1 in FIG. 5. When the differences in speed calculated in step S14 are less than the first threshold (No in step S15), the processing in step S12 and subsequent steps described above is repeated. When any of the differences in speed calculated in step S14 is greater than or equal to the first threshold (Yes in step S15), the determiner 61 outputs, to the brake control device 12, information about the axle 14*a*, 14*b*, 14*c*, or 14*d* having an axle speed that has a difference from the reference axle speed greater than or equal to the first threshold (step S16). When the processing in step S16 ends, the processing in step S12 and subsequent steps described above is repeated.

When the received operation command does not include a braking command (No in step S41), the reference axle speed decider 60 decides, as the reference axle speed, the minimum value of speeds that are each axle speed decided in step S12 and the reference axle speed acquired from the slip-and-skid determining device 36 (step S42).

The determiner 61 calculates the difference between each axle speed decided in step S12 and the reference axle speed decided in step S42 (step S43). When the differences in speed calculated in step S43 are less than the third threshold (No in step S44), the processing in step S12 and subsequent steps described above is repeated.

When at least any of the differences in speed calculated in step S43 is greater than or equal to the third threshold (Yes in step S44), the determiner 61 transmits a notice of a slip to the power conversion circuit controller 86 (step S45).

Figure 20:
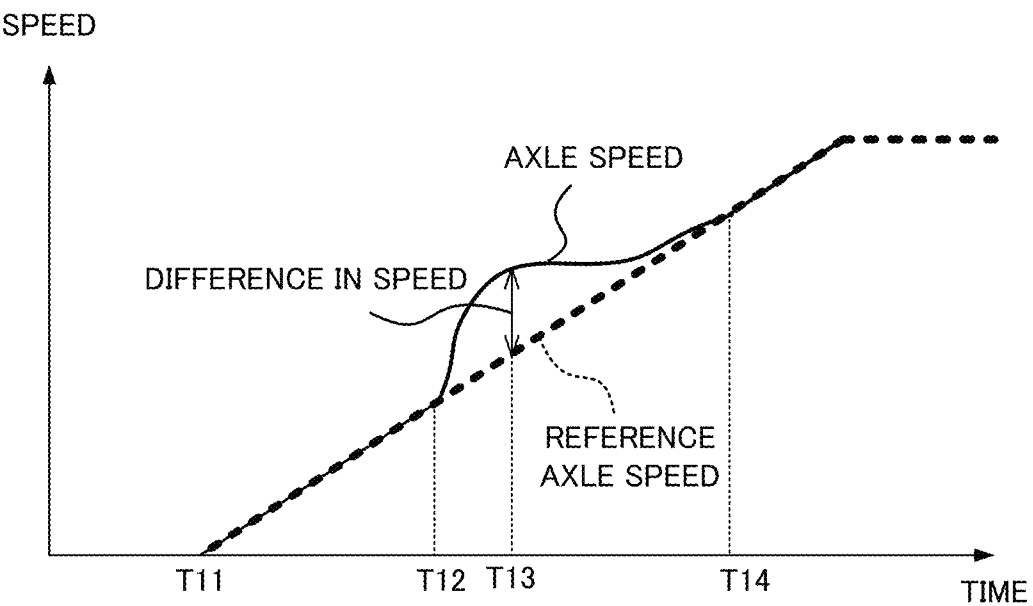
FIG. 20 illustrates example changes in an axle speed and a reference axle speed in Embodiment 5.

When, for example, all the wheels 15*a*, 15*b*, 15*c*, and 15*d* slip and none of the wheels 25*a*, 25*b*, 25*c*, and 25*d* slips, the axle speed and the reference axle speed change in the vehicle 100 as illustrated in FIG. 20. In FIG. 20, the solid line indicates changes in the axle speed, and the dotted line indicates changes in the reference axle speed. In FIG. 20, the horizontal axis indicates time, and the vertical axis indicates speed. Power running is started at time T11. At time T11, the master controller 5 is controlled to transmit an operation command including a powering command to the slip-and-skid determining devices 35 and 36. At time T11 and subsequent times, the axle speed and the reference axle speed increase at a constant rate based on the target acceleration.

All the wheels 15*a*, 15*b*, 15*c*, and 15*d* slip at time T12. At time T12, the axle speeds of all the axles 14*a*, 14*b*, 14*c*, and 14*d* start increasing rapidly. None of the wheels 25*a*, 25*b*, 25*c*, and 25*d* slips at time T12 and subsequent times. Thus, the reference axle speed acquired by the slip-and-skid determining device 35 from the slip-and-skid determining device 36 increases at a constant rate based on the target acceleration. Thus, although the axle speeds of all the axles 14*a*, 14*b*, 14*c*, and 14*d* rapidly increase, the reference axle speed decider 60 in the slip-and-skid determining device 35 outputs the reference axle speed that increases at a constant rate unlike the rapidly increasing axle speed of the axles 14*a*, 14*b*, 14*c*, and 14*d*.

For example, the difference between the axle speed of each of the axles 14*a*, 14*b*, 14*c*, and 14*d* and the reference axle speed reaches the third threshold at time T13. At time T13, the difference in speed between the axle speed of each of the axles 14*a*, 14*b*, 14*c*, and 14*d* and the reference axle speed is greater than or equal to the third threshold, causing the determiner 61 in the slip-and-skid determining device 35 to transmit a notice of a slip to the power conversion circuit controller 86.

Upon receiving the notice of a slip from the slip-and-skid determining device 35, the power conversion circuit controller 86 sets the torque command value τ* to a smaller value than the torque command value τ* decided based on the target acceleration of the railway vehicle 1 indicated by the powering command and the measurement value of the rotational speed of the electric motor 87. The power conversion circuit controller 86 generates the power conversion control signal based on the torque command value τ* set to the smaller value.

When the power conversion control signal generated as described above is provided to the gate terminal for each switching element in the power conversion circuit 84, the power output from the power conversion circuit 84 decreases and the rotational speed of the electric motor 87 decreases as well. When the rotational speed of the electric motor 87 decreases and the acceleration is reduced, the difference between the axle speed of each of the axles 14*a*, 14*b*, 14*c*, and 14*d* and the reference axle speed starts decreasing. Subsequently, the difference between the axle speed of each of the axles 14*a*, 14*b*, 14*c*, and 14*d* and the reference axle speed reaches zero, thus achieving re-adhesion of the wheels 15*a*, 15*b*, 15*c*, and 15*d* to the rails at time T14.

As described above, the slip-and-skid determining device 35 according to Embodiment 5 decides the reference axle speed based on the axle speed of each of the axles 14*a*, 14*b*, 14*c*, and 14*d* in the vehicle 100 and the axle speed of each of the axles 24*a*, 24*b*, 24*c*, and 24*d* in the other vehicle 200. This prevents the reference axle speed from changing rapidly unlike the axle speed of each of the axles 14*a*, 14*b*, 14*c*, and 14*d* in the vehicle 100, although all the wheels 15*a*, 15*b*, 15*c*, and 15*d* attached to the axles 14*a*, 14*b*, 14*c*, and 14*d* skid or slip, thus allowing determination of the occurrence of a skid or a slip of any wheel based on the difference between each axle speed and the reference axle speed.

Similarly, the slip-and-skid determining device 36 decides the reference axle speed based on the axle speed of each of the axles 24*a*, 24*b*, 24*c*, and 24*d* in the vehicle 200 and the axle speed of each of the axles 14*a*, 14*b*, 14*c*, and 14*d* in the other vehicle 100. This allows determination of the occurrence of a skid or slip of any of the wheels 25*a*, 25*b*, 25*c*, and 25*d* attached to the axles 24*a*, 24*b*, 24*c*, and 24*d* in the vehicle 200 based on the difference between each axle speed and the reference axle speed, although all the wheels 25*a*, 25*b*, 25*c*, and 25*d* skid or slip.

The present disclosure is not limited to the above embodiments. The above embodiments may be combined as appropriate. For example, the occurrence of a slip or a skid may be determined in Embodiments 1 to 4 in the same manner as in Embodiment 5.

Figure 21:
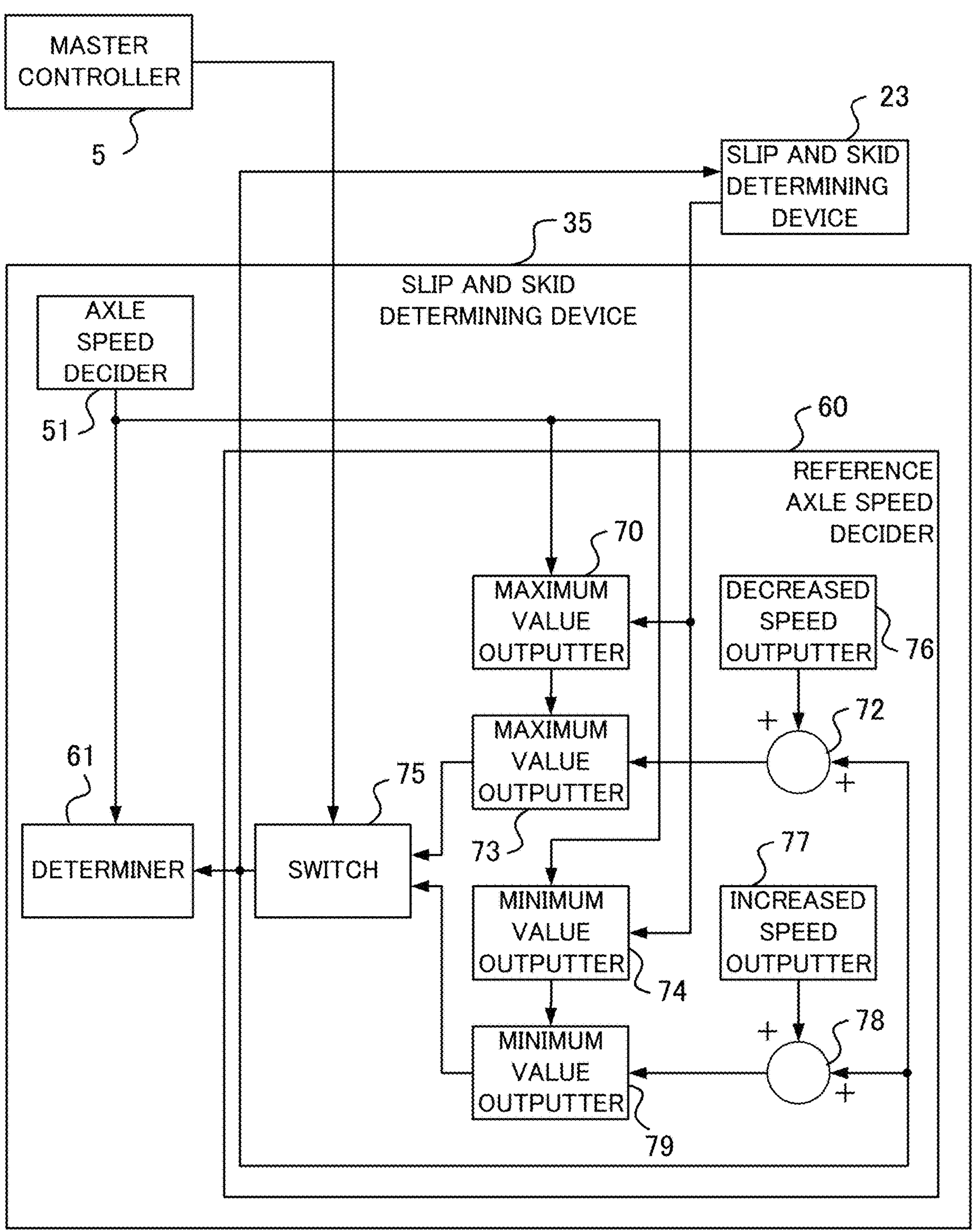
FIG. 21 is a block diagram illustrating a reference axle speed decider in a first modification of an embodiment.

In another example, similarly to the reference axle speed decider 56, the reference axle speed decider 60 in the slip-and-skid determining device 35 according to Embodiment 5 may decide the reference axle speed that maintains the rate of change in the reference axle speed within the target range. More specifically, the reference axle speed decider 60 in FIG. 21 includes a decreased speed outputter 76 that outputs a limit value of decrease in speed in a calculation cycle, and an increased speed outputter 77 that outputs a limit value of increase in speed in a calculation cycle. The reference axle speed decider 60 further includes an adder 78 that adds a value output from the increased speed outputter 77 to the most recently decided reference axle speed, and a minimum value outputter 79 that outputs a minimum value of values output from the minimum value outputter 74 and from the adder 78.

The decreased speed outputter 76 outputs, as the above limit value (in km/h), for example, the decreased speed of the vehicle 100 in each calculation cycle based on the maximum value of the target deceleration indicated by the braking command.

The adder 72 adds the value (in km/h) output from the decreased speed outputter 76 to the most recently decided reference axle speed (in km/h) output from the switch 75. The value output from the adder 72 corresponds to the axle speed of each of the axles 14*a*, 14*b*, 14*c*, and 14*d* that can be achieved in accordance with the maximum value of the target deceleration when no skid occurs.

The increased speed outputter 77 outputs, as the above limit value (in km/h), for example, the increased speed of the vehicle 100 in each calculation cycle in accordance with the maximum value of the target acceleration indicated by the powering command.

The adder 78 adds the value (in km/h) output from the increased speed outputter 77 to the most recently decided reference axle speed (in km/h) output from the switch 75. The value output from the adder 78 corresponds to the axle speed of each of the axles 14*a*, 14*b*, 14*c*, and 14*d* that can be achieved based on the maximum value of the target acceleration when no slip occurs.

The minimum value outputter 79 outputs the minimum value of values output from the minimum value outputter 74 and from the adder 78.

The switch 75 outputs the value output from the maximum value outputter 73 when the operation command includes a braking command, and outputs the value output from the minimum value outputter 79 when the operation command does not include a braking command. The reference axle speed output from the switch 75 changes in each calculation cycle based on the limit value as the upper limit value output from the decreased speed outputter 76 or output from the increased speed outputter 77.

Figure 22:
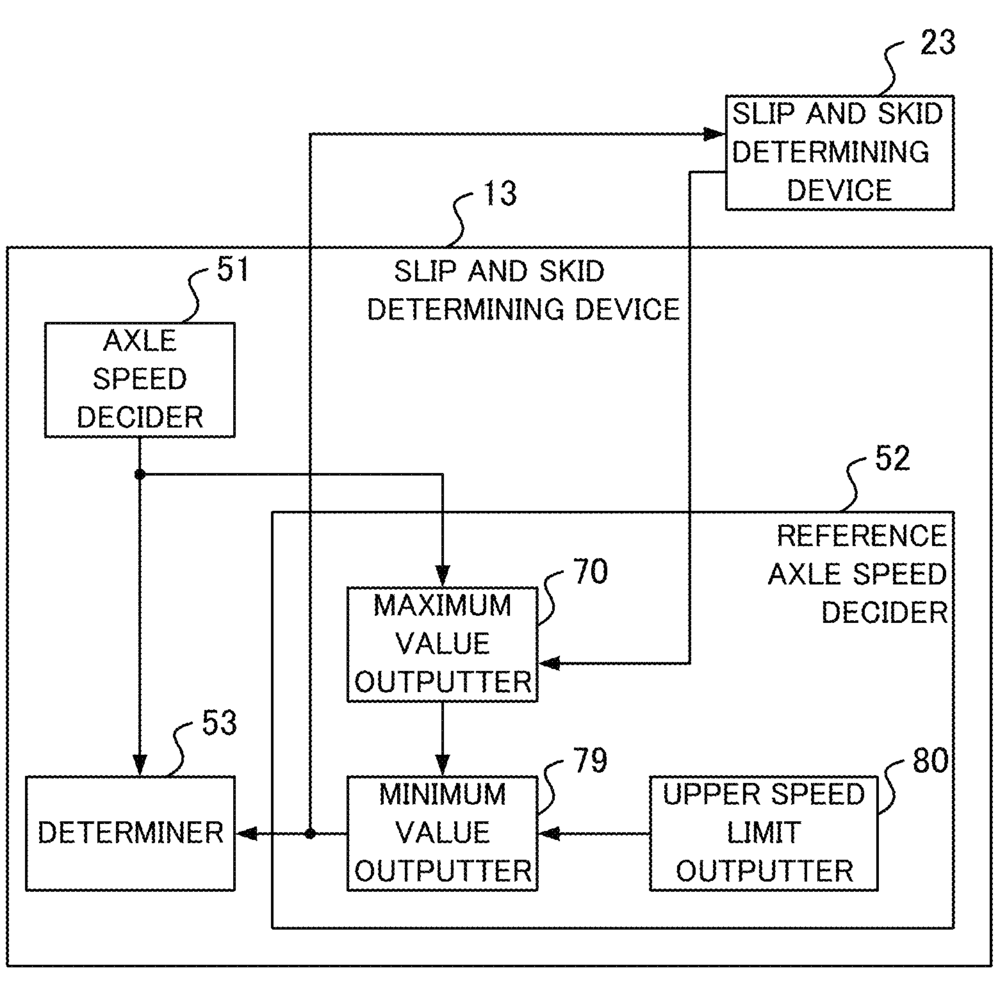
FIG. 22 is a block diagram illustrating a reference axle speed decider in a second modification of an embodiment.

In still another example, to prevent the reference axle speed from increasing with a fault in the speed detector 16*a*, 16*b*, 16*c*, or 16*d*, the slip-and-skid determining device 13 may have an upper limit value for the reference axle speed. The slip-and-skid determining device 13 in FIG. 22 includes the maximum value outputter 70 that outputs the maximum value of speeds that are each axle speed acquired from the axle speed decider 51 and the reference axle speed acquired from the slip-and-skid determining device 23, an upper speed limit outputter 80 that outputs the upper limit value of the reference axle speed, and the minimum value outputter 79 that outputs the minimum value of values output from the maximum value outputter 70 and from the upper speed limit outputter 80. The upper limit value of the reference axle speed may be determined in accordance with, for example, the maximum speed that can be achieved by the railway vehicle 1.

The railway vehicle 1 may include any number of vehicles. The acceleration detector 82 may be located in some vehicles or in each vehicle.

The reference axle speed deciders 52 and 60 may acquire, instead of the reference axle speed of the other vehicle 200, the axle speed of each of the axles 24*a*, 24*b*, 24*c*, and 24*d* in the other vehicle 200.

The vehicle speed decider 54 may determine the position of the railway vehicle 2 based on radio waves from a global positioning system (GPS) satellite, and may decide the speed of the vehicle 100 based on a change in the position of the railway vehicle 2 per unit time.

Each of the slip-and-skid determining devices 13, 23, 31, 32, 33, 34, 35, and 36 may use the rotational speed of each of the axles 14*a*, 14*b*, 14*c*, and 14*d* as the corresponding axle speed. For example, the slip-and-skid determining device 13 may decide the reference axle speed based on the rotational speed of each of the axles 14*a*, 14*b*, 14*c*, and 14*d* and the rotational speed of each of the axles 24*a*, 24*b*, 24*c*, and 24*d*.

The processes performed by the slip-and-skid determining devices 13, 23, 31, 32, 33, 34, 35, and 36 when a skid is determined to have occurred are not limited to the examples described above. When, for example, occurrence of a skid is determined by the slip-and-skid determining device 13, the target brake force decider 41 in the brake control device 12 sets the target brake force to a smaller value than the target brake force decided based on the target deceleration and the load on the vehicle 100. The target pressure decider 42 decides the target pressure based on the target brake force set to the smaller value. In this state, the slip-and-skid determining devices 13 and 23 transmit or receive, to or from each other, the determination results. Upon receiving a notice of a skid in the vehicle 100 from the slip-and-skid determining device 23, the brake control device 12 in the vehicle 200 preferably sets the target brake force to a greater value than the target brake force decided based on the target deceleration and the load on the vehicle 200. An increase in the braking distance resulting from the skid is thus suppressed.

The slip-and-skid determining devices 13, 23, 31, 32, 33, 34, 35, and 36 may be implemented as one function of the train information management system, or may be located in a ground equipment, for example, an operation control center.

The mechanical brake devices in the vehicles 100 and 200 are not limited to the examples described above. The vehicles 100 and 200 may each include a mechanical brake device that generates a brake force by pressing a brake pad as a frictional member against a brake disk as a rotor.

Figure 23:
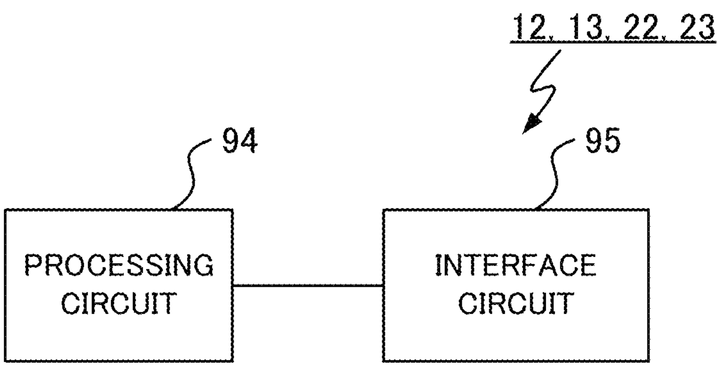
FIG. 23 illustrates a modification of a hardware configuration of a slip-and-skid determining device.

The hardware configurations of the brake control devices 12 and 22 and the slip-and-skid determining devices 13, 23, 31, 32, 33, 34, 35, and 36 are not limited to the examples described above. The brake control devices 12 and 22 and the slip-and-skid determining devices 13, 23, 31, 32, 33, 34, 35, and 36 may be implemented by a processing circuit 94, as illustrated in FIG. 23. The processing circuit 94 is connected to an external device through an interface circuit 95. For example, the brake control device 12 is connected to the master controller 5, the load detector 11, the slip-and-skid determining device 13, and the anti-skid valves 19*a*, 19*b*, 19*c*, and 19*d* through the interface circuit 95. The slip-and-skid determining device 13 is connected to the master controller 5, the slip-and-skid determining device 23, and the speed detectors 16*a*, 16*b*, 16*c*, and 16*d* through the interface circuit 95.

When the processing circuit 94 is dedicated hardware, the processing circuit 94 includes, for example, a single circuit, a complex circuit, a processor, an application-specific integrated circuit (ASIC), a field-programmable gate array (FPGA), or a combination of two or more of these. Each component of the brake control devices 12 and 22 and each component of the slip-and-skid determining devices 13, 23, 31, 32, 33, 34, 35, and 36 may be implemented by an individual processing circuit 94 or a shared processing circuit 94.

Some of the functions of the brake control devices 12 and 22 and the slip-and-skid determining devices 13, 23, 31, 32, 33, 34, 35, and 36 may be implemented by dedicated hardware, and others may be implemented by software or firmware. For example, in the slip-and-skid determining device 13, the processing circuit 94 in FIG. 23 may implement the functions of the axle speed decider 51 and the reference axle speed decider 52, and the processor 91 in FIG. 4 reads and executes the programs stored in the memory 92 to implement the functions of the determiner 53.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1, 2 Railway vehicle
5 Master controller
10, 20 Brake control system
11, 21 Load detector
12, 22 Brake control device
13, 23, 31, 32, 33, 34, 35, 36 Slip-and-skid determining device
14*a*, 14*b*, 14*c*, 14*d*, 24*a*, 24*b*, 24*c*, 24*d* Axle
15*a*, 15*b*, 15*c*, 15*d*, 25*a*, 25*b*, 25*c*, 25*d* Wheel
16*a*, 16*b*, 16*c*, 16*d*, 26*a*, 26*b*, 26*c*, 26*d* Speed detector
17*a*, 17*b*, 17*c*, 17*d*, 27*a*, 27*b*, 27*c*, 27*d* Brake block
18*a*, 18*b*, 18*c*, 18*d*, 28*a*, 28*b*, 28*c*, 28*d* Brake cylinder
19*a*, 19*b*, 19*c*, 19*d*, 29*a*, 29*b*, 29*c*, 29*d* Anti-skid valve
41 Target brake force decider
42 Target pressure decider
43 Output valve
44 Pressure sensor
45 Electro-pneumatic conversion valve
46 Relay valve
47 Re-adhesion controller
51 Axle speed decider
52, 55, 56, 60 Reference axle speed decider
53, 59, 61 Determiner
54 Vehicle speed decider
57 Axle acceleration decider
58 Acceleration difference calculator
70, 73 Maximum value outputter
71 Acceleration converter
72, 78 Adder
74, 79 Minimum value outputter
75 Switch
76 Decreased speed outputter
77 Increased speed outputter
80 Upper speed limit outputter
81 Fluid source
82 Acceleration detector
83 Power converter
83*a*, 83*b* Input terminal
84 Power conversion circuit
85 Current detection circuit
86 Power conversion circuit controller
87 Electric motor
90) Bus
91 Processor
92 Memory
93 Interface
94 Processing circuit
95 Interface circuit
100, 200 Vehicle
C1 Capacitor
L1 Reactor

The invention claimed is:

1. A slip-and-skid determining device provided for each of one or more vehicles included in a railway vehicle, comprising:

axle speed deciding circuitry configured to decide, for each of a plurality of axles in a vehicle of the one or more vehicles, an axle speed changeable in accordance with a rotational speed of a wheel attached to each of the plurality of axles in the vehicle;

reference axle speed deciding circuitry configured to decide, based on the axle speeds of the plurality of axles in the vehicle and a physical quantity changeable during travel of the railway vehicle, a reference axle speed in the vehicle; and determining circuitry configured to determine, based on comparison between the axle speed of one of the plurality of axles and the reference axle speed, whether any slip or skid of the wheel of the one of the plurality of axles occurs.

2. The slip-and-skid determining device according to claim 1, wherein the one or more vehicles is a plurality of the vehicles, and the reference axle speed deciding circuitry decides the reference axle speed based on the axle speeds of the plurality of axles in the vehicle and axle speeds of a plurality of axles in another vehicle of the plurality of vehicles.

3. The slip-and-skid determining device according to claim 2, wherein the reference axle speed deciding circuitry selects, as the reference axle speed, a maximum value of speeds that are the axle speeds of the plurality of axles in the vehicle and the axle speeds of the plurality of axles in the another vehicle, and the determining circuitry determines, based on comparison between the axle speed of the one of the plurality of axles and the reference axle speed, whether any skid of the wheel of the one of the plurality of axles occurs.

4. The slip-and-skid determining device according to claim 2, wherein the reference axle speed deciding circuitry selects, as the reference axle speed, a minimum value of the axle speeds of the plurality of axles in the vehicle and the axle speeds of the plurality of axles in the another vehicle, and the determining circuitry determines, based on comparison between the axle speed of the one of the plurality of axles and the reference axle speed, whether any slip of the wheel of the one of the plurality of axles occurs.

5. The slip-and-skid determining device according to claim 1, wherein the reference axle speed deciding circuitry decides the reference axle speed based on the axle speeds of the plurality of axles in the vehicle and a speed of the railway vehicle.

6. The slip-and-skid determining device according to claim 5, wherein the reference axle speed deciding circuitry selects, as the reference axle speed, a maximum value of speeds that are the axle speeds of the plurality of axles in the vehicle and the speed of the railway vehicle, and the determining circuitry determines, based on comparison between the axle speed of one of the plurality of axles and the reference axle speed, whether any skid of the wheel of the one of the plurality of axles occurs.

7. The slip-and-skid determining device according to claim 5, wherein the reference axle speed deciding circuitry selects, as the reference axle speed, a minimum value of the axle speeds of the plurality of axles in the vehicle and the speed of the railway vehicle, and the determining circuitry determines, based on comparison between the axle speed of one of the plurality of axles and the reference axle speed, whether any slip of the wheel of the one of the plurality of axles occurs.

8. The slip-and-skid determining device according to claim 1, wherein the reference axle speed deciding circuitry decides the reference axle speed that maintains a rate of change in the reference axle speed within a target range.

9. The slip-and-skid determining device according to claim 8, wherein the reference axle speed deciding circuitry decides the reference axle speed that maintains the rate of change in the reference axle speed within the target range defined based on an acceleration of the railway vehicle.

10. The slip-and-skid determining device according to claim 1, further comprising:

axle acceleration deciding circuitry configured to decide an axle acceleration based on the axle speeds, wherein the determining circuitry determines, based on comparison between the axle speed speeds and the reference axle speed or comparison between the axle acceleration and an acceleration of the railway vehicle, whether any slip or skid of the vehicle occurs.

11. The slip-and-skid determining device according to claim 1, wherein the axle speed deciding circuitry decides, based on the rotational speed of the wheel attached to each of the plurality of axles, the axle speeds each corresponding to a circumferential speed of the wheel.

12. A brake control system, comprising:

a brake control device configured to control, in accordance with a braking command indicating a target deceleration being a target value for a deceleration of the railway vehicle, a mechanical brake device provided for each of a plurality of wheels in a vehicle of one or more vehicles included in a railway vehicle, the mechanical brake device being configured to decelerate braking command the vehicle by pressing a frictional member against a rotor rotating during travel of the railway vehicle based on pressure of a fluid supplied; and the slip-and-skid determining device according to claim 1, wherein the brake control device includes target brake force deciding circuitry configured to acquire the braking command and decide a target brake force being a brake force to achieve the target deceleration, target pressure deciding circuitry configured to decide, based on the target brake force, a target pressure being a target value for the pressure of the fluid to be supplied to the mechanical brake device, an output valve configured to compress the fluid supplied from a fluid source in accordance with the target pressure and supply the compressed fluid to the mechanical brake device, and re-adhesion controlling circuitry configured to reduce, when a determination result is received from the slip-and-skid determining device and the determining circuitry in the slip-and-skid determining device determines that a skid of at least one wheel of the plurality of wheels occurs, the brake force generated by the mechanical brake device corresponding to the at least one wheel for which the occurrence of skid is determined by the determining circuitry.

13. A slip-and-skid determining method performed by a slip-and-skid determining device provided for each of one or more vehicles included in a railway vehicle, comprising:

deciding, for each of a plurality of axles in a vehicle of the one or more vehicles, an axle speed changeable in accordance with a rotational speed of a wheel attached to each of the plurality of axles in the vehicle;

deciding a reference axle speed in the vehicle based on the axle speeds of the plurality of axles in the vehicle and a physical quantity changeable during travel of the railway vehicle; and determining, based on comparison between the axle speed of one of the plurality of axles and the reference axle speed, whether any slip or skid of the wheel of the one of the plurality of axles occurs.

* * * * *